United States Patent
Yu et al.

(10) Patent No.: US 9,890,491 B2
(45) Date of Patent: Feb. 13, 2018

(54) LAUNDRY TREATMENT APPARATUS

(71) Applicant: LG ELECTRONICS INC., Seoul (KR)

(72) Inventors: Insik Yu, Seoul (KR); Youngjun Kim, Seoul (KR); Youngjong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 678 days.

(21) Appl. No.: 14/337,891

(22) Filed: Jul. 22, 2014

(65) Prior Publication Data
US 2015/0020552 A1   Jan. 22, 2015

(30) Foreign Application Priority Data
Jul. 22, 2013   (KR) .................. 10-2013-0086228

(51) Int. Cl.
| D06F 37/26 | (2006.01) |
| D06F 37/20 | (2006.01) |
| F16F 7/09 | (2006.01) |
| D06F 37/24 | (2006.01) |
| D06F 23/04 | (2006.01) |

(52) U.S. Cl.
CPC ............ *D06F 37/265* (2013.01); *D06F 37/20* (2013.01); *F16F 7/09* (2013.01); *D06F 23/04* (2013.01); *D06F 37/24* (2013.01); *D06F 2222/00* (2013.01)

(58) Field of Classification Search
CPC .................................................. D06F 37/265
See application file for complete search history.

(56) References Cited

U.S. PATENT DOCUMENTS

| 2006/0054440 A1* | 3/2006 | Peuker ............ D06F 37/20 188/381 |
| 2007/0039792 A1* | 2/2007 | Peuker ............ D06F 37/20 188/322.16 |
| 2011/0167878 A1 | 7/2011 | De Angelo Sanchez et al. |

FOREIGN PATENT DOCUMENTS

| KR | 200117588 Y1 | 7/1998 |
| KR | 200320745 Y1 | 7/2003 |
| KR | 101054181 B1 | 8/2011 |
| KR | 101217118 B1 | 12/2012 |

* cited by examiner

*Primary Examiner* — Jason Ko
(74) *Attorney, Agent, or Firm* — Dentons US LLP

(57) ABSTRACT

A laundry treatment apparatus including a casing, an outer tub provided in the casing, an inner tub rotatably disposed in the outer tub and a pivot pivotably supported with respect to the casing. A supporting rod connected with the pivot and the outer tub to hang the outer tub in the casing. A moving member is movably provided along the supporting rod. A first connecting member connected with the moving member. A second connecting member whose position varies with respect to the first connecting member. A frictional member provided at any one of the first connecting member and the second connecting member. The moving member includes a pivot combining part provided to be combinable with the pivot to prevent the supporting rod from escaping through the other end of the moving member while the supporting rod is not connected with the outer tub.

20 Claims, 25 Drawing Sheets

FIG. 4
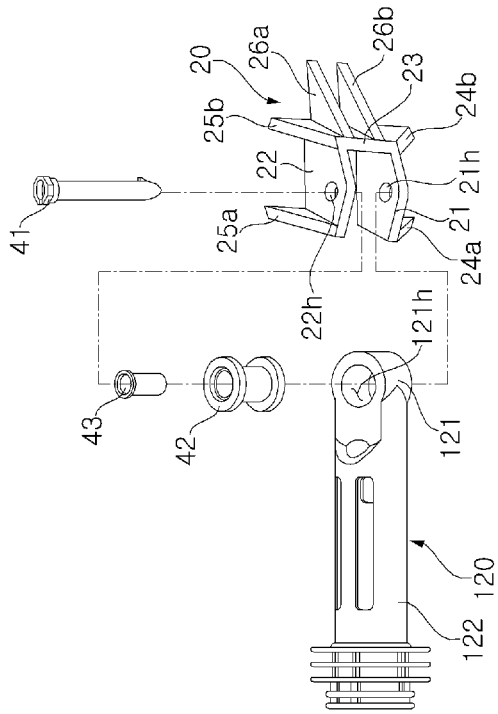
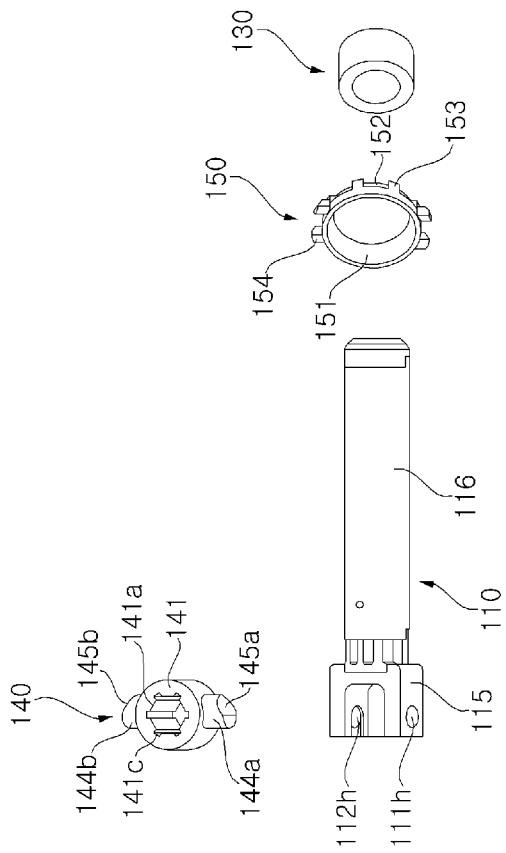

(a) (b)

LAUNDRY TREATMENT APPARATUS

CROSS-REFERENCE TO RELATED APPLICATION

This application claims the priority benefit of Korean Patent Application No. 10-2013-0086228, filed on Jul. 22, 2013 in the Korean Intellectual Property Office, the disclosure of which is incorporated herein by reference.

BACKGROUND

Field of the Disclosure

The present disclosure relates to a laundry treatment apparatus having an outer tub with reduced horizontal vibration.

Background of the Related Art

The laundry treatment apparatus treats laundry by typically applying physical or chemical actions to the laundry and includes a washer that removes dirt from the laundry, a dehydrator that rotates at a high speed, a washing tub containing the laundry to dehydrate the laundry, and a dryer that supplies cool or hot air into the washing tub to dry wet laundry.

A laundry treatment apparatus includes an outer tub supported and hung by a supporting rod in the casing and an inner tub rotating in the outer tub with laundry (or clothes) contained therein. A washer sometimes further include a pulsator (or washing blades) that rotates in the inner tub. Such configuration may cause the outer tub to vibrate when the pulsator spins. Accordingly, a typical laundry treatment apparatus has a device for mitigating vibration of the outer tub.

Conventionally, a buffering device is provided to connect the supporting rod with the outer tub. However, the buffering device primarily plays a role to reduce vertical vibration of the outer tub and does not work well enough to decrease horizontal vibration.

In particular, the recent trend of maximizing the volume of the outer tub without increasing the overall size of the laundry treatment apparatus as much as possible, in order to increase use of the residential space. This leads to a decreased gap between the casing and the outer tub. However, as the gap between the casing and the outer tub decreases, the horizontal vibration is more likely to cause collisions between the outer tub and the casing. Thus, a need exists for methods for effectively reducing the horizontal vibration of the outer tub.

SUMMARY

According to an embodiment of the present invention, a laundry treatment apparatus comprises: a casing; an outer tub provided in the casing; an inner tub rotatably disposed in the outer tub; a pivot pivotably supported with respect to the casing; a supporting rod having an end connected with the pivot and another end connected with the outer tub to hang the outer tub in the casing; a moving member movably provided along the supporting rod; a first connecting member connected with the moving member; a second connecting member whose position varies with respect to the first connecting member as the outer tub vibrates; and a frictional member provided at any one of the first connecting member and the second connecting member, the frictional member providing a frictional force between itself and the other connecting member, wherein the moving member includes a pivot combining part provided to be combinable with the pivot to prevent the supporting rod from escaping through the other end of the moving member while the supporting rod is not connected with the outer tub.

According to another embodiment of the present invention, a laundry treatment apparatus comprises: a casing; an outer tub provided in the casing; a supporting rod hanging the outer tub in the casing; a first connecting member connected with a support positioned outside the outer tub; a horizontal displacing part connecting the first connecting member with the outer tub, moving along a vertical direction of the first connecting member as the outer tub vibrates, and having a displacement with respect to the first connecting member corresponding to a horizontal component distance of the moved displacement; and a frictional member provided at any one of the first connecting member and the horizontal displacing part to provide a frictional force between itself and the other, wherein the horizontal displacing part includes a latching protrusion that is latched to the first connecting member to restrict displacement when the displacement of the horizontal displacing part with respect to the first connecting member reaches a predetermined amount.

According to still another embodiment of the present invention, a laundry treatment apparatus comprises: a casing; an outer tub provided in the casing; a supporting rod hanging the outer tub in the casing; a piston connected with any one of the outer tub and a support positioned outside the outer tub; a cylinder through which the piston is inserted, the cylinder connected with the other of the outer tub and the support, wherein the cylinder has a displacement with respect to the piston as the outer tub vibrates; a frictional member provided at any one of the piston and the cylinder to provide a frictional force between itself and the other; and a restricting member coupled with the cylinder to restrict displacement of the cylinder with respect to the piston.

According to yet still another embodiment of the present invention, a laundry treatment apparatus comprises: a casing; an outer tub provided in the casing; an inner tub disposed rotatably in the outer tub; a supporting rod hanging the outer tub in the casing; a moving member movably provided along the supporting rod; a piston; a cylinder through which the piston is inserted and the cylinder having a displacement with respect to the piston as the outer tub vibrates; a frictional member provided at any one of the piston and the cylinder to provide a frictional force between itself and the other; a moving member connecting part connecting any one of the piston and the cylinder to the moving member; and an outer tub connecting part connecting the other of the piston and the cylinder to the outer tub, wherein when the supporting rod corresponds to a Z axis in a 3D orthogonal coordinates system consisting of an X axis, a Y axis and the Z axis, the moving member is provided to permit a Z-axis movement and rotation with respect to the Z axis, and the moving member connecting part rotates about both the X axis and the Y axis with respect to the moving member.

According to yet still another embodiment of the present invention, a laundry treatment apparatus comprises: a casing; an outer tub provided in the casing; an inner tub disposed rotatably in the outer tub; a supporting rod hanging the outer tub in the casing; a ball element provided to permit a movement along a length direction of the supporting rod and rotation with respect to the supporting rod as an axis; a piston; a cylinder into which the piston is inserted and having a displacement with respect to the piston as the outer tub vibrates; a frictional member provided at any one of the piston and the cylinder to provide a frictional force between itself and the other; and a socket element connecting any one of the piston and the cylinder to the ball element and provided to wrap around the ball element to permit rotation about the ball element.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

The above and other objects, features and other advantages will be more clearly understood from the following detailed description taken in conjunction with the accompanying drawings, in which:

FIG. 4 is an exploded perspective view illustrating the horizontal vibration attenuating part of FIG. 2;

DETAILED DESCRIPTION OF THE ILLUSTRATED EMBODIMENTS

Description will now be given in detail of the exemplary embodiments, with reference to the accompanying drawings. For the sake of brief description with reference to the drawings, the same or equivalent components may be provided with the same reference numbers, and description thereof may not be repeated.

Hereinafter, a washer is described as an example of the laundry treatment apparatus. However, the scope of the present invention is not limited thereto.

Figure 1:
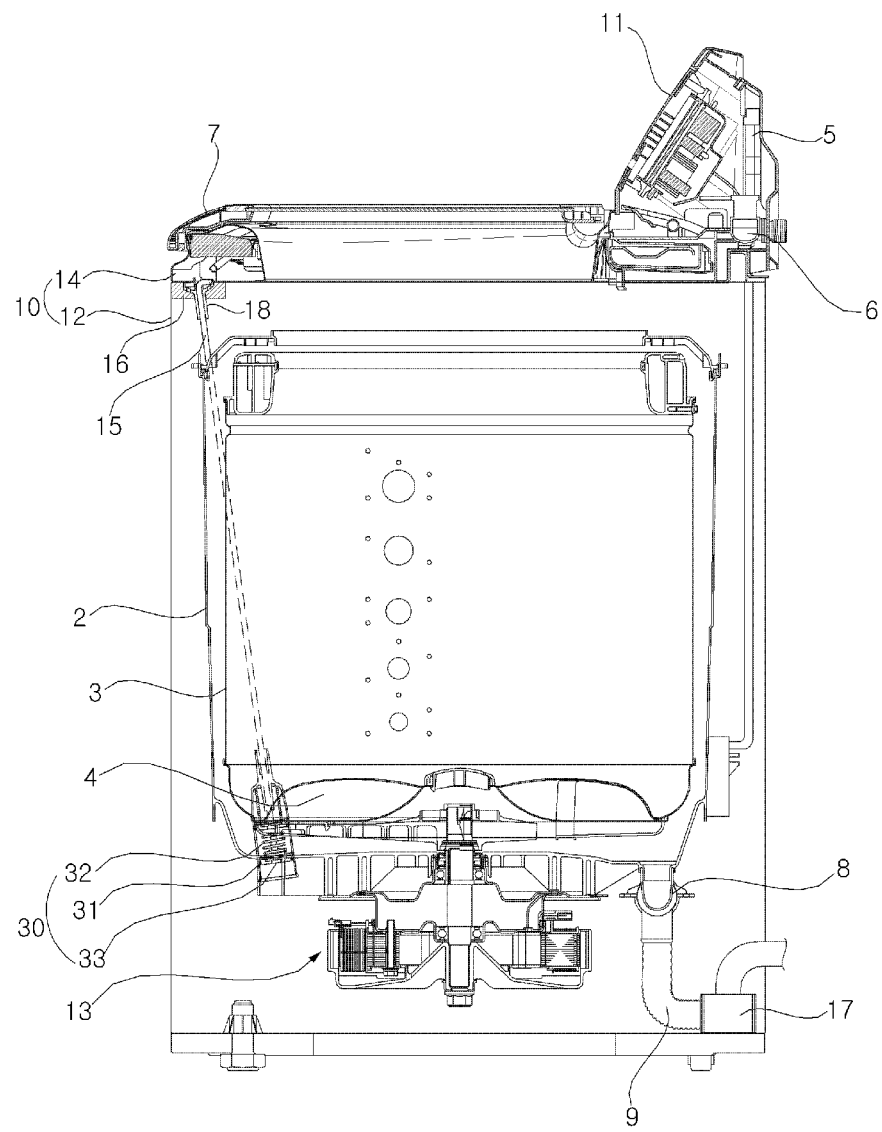
FIG. 1 is a view illustrating an inside of a washer according to an embodiment of the present invention.

FIG. 1 is a view illustrating the inside of a washer according to an embodiment of the present invention. Referring to FIG. 1, the washer according to an embodiment of the present invention includes a casing 10 forming an outer appearance of the washer, a control panel 11 having manipulation keys for receiving various control commands from a user and a display for displaying information on the operational state of the washer to provide a user interface, and a door 7 rotatably provided at the casing 10 to open and close an entrance/exit hole (not shown) through which laundry is entered or exited.

The outer tub 2 containing washing water is hung by the supporting rod 15 in the casing 10. An inner tub 3 is rotatably provided in the outer tub 2 to receive laundry, and the inner tub 3 has a plurality of holes through which washing water passes. A pulsator 4 may be rotatably provided at the bottom of the inner tub 3.

The casing as defined herein may be of any type as long as it forms the outer appearance of the washer. In particular, the casing is preferably a fixture that does not move so that an end of the supporting rod 15 hanging the outer tub 2 may be fixed by the casing.

The casing 10 may have a main body 12 having an upper side opened and a top cover 14 provided at an upper side of the main body 12 and having an entrance/exit hole at substantially a middle part thereof to insert and remove laundry.

A pivot 18 is coupled with an end of the supporting rod 15. The pivot 18 may include a pivot body 18b pivotably supported by a pivot support 16 and a neck 18a extending from the pivot body 18b and having the supporting rod 15 pass through the inside thereof (refer to FIG. 7).

The pivot support 16 is fixed to the casing 10 and permits the pivot 18 to pivot within a predetermined range. The pivot 18 is inserted from an upper side through an opening formed at substantially a middle part of the pivot support 16, but without completely passing therethrough, is supported as the pivot body 18b is stuck to the opening. The pivot support 16 may be fixed by either the main body 12 or the top cover 14.

The supporting rod 15 has an end coupled with the pivot 18 and the other end connected with the outer tub 2 by a suspension 30. The suspension 30 connects the supporting rod 15 with the outer tub 2 while attenuating vibration of the outer tub 2 that occurs while the washer operates. The suspension 30 may include a cap 31 fixed to an outer surface of the outer tub 2 and an elastic member 32 that is elastically deformed as the outer tub 2 vibrates. The supporting rod 15 passes through the cap 31, and an end of the supporting rod 15 has a base 33 supporting the elastic member 32.

When the outer tub 2 vibrates, the suspension cap 31, together with the outer tub 2, moves up and down along the supporting rod 15. A buffering operation is performed by a frictional force exerted between the cap 31 and the base 33 while the cap 31, together with the outer tub 2, moves, a viscous force exerted as the compressed air exits a space between the inner circumferential surface of the cap 31 and the base 33 while the cap 31 moves, and a mutual operation between elastic force and restoring force due to elastic deformation of the elastic member 32.

Meanwhile, the components denoted with the reference numerals shown in FIG. 1 are described. The washer may include a water supply path 5 connected with an external water source such as a faucet to supply water to the inside of the outer tub 2 and/or inner tub 3, a water supply valve 6 switching on/off the water supply path 5, a driver 13 providing a driving force for rotating the inner tub 3 and/or the pulsator 4, a water discharge path 9 discharging washing water from the inside of the outer tub 2, a water discharge valve 8 switching on/off the water discharge path 9, and/or a water discharge pump 17 pumping the washing water discharged through the water discharge path 9 to the outside of the washer.

According to an embodiment of the present invention, the washer includes a horizontal vibration attenuating part for reducing vibration of the outer tub 2. The vertical vibration of the outer tub 2 is attenuated primarily by the suspension 30 provided at a lower part of the outer tub 2, and the horizontal vibration is attenuated primarily by the horizontal vibration attenuating part.

A specific configuration of the horizontal vibration attenuating part will be described below with reference to the drawings, and terms are first defined. The first connecting member and the second connecting member are members for connecting the outer tub 2 to supports positioned outside the outer tub 2. Any type of supports may be used as long as the first connecting member is connected thereto, and as an example, the casing 10 or supporting rod 15 may be the support. The member connected with the supports is denoted the first connecting member, and the member connected with the outer tub 2 is denoted the second connecting member. However, although the first connecting member is connected with the supporting rod 15 for the purpose of description, the present invention is not limited thereto. The first connecting member may be connected with the casing 10.

The first connecting member and the second connecting member conduct relative motion according to the displacement of the outer tub 2. Relative motion is caused between the first connecting member and the second connecting member by vibration of the outer tub 2. That is, any one of the first connecting member and the second connecting member causes displacement with respect to the other.

The moving member is provided movably along the supporting rod 15 and is connected with the first connecting member. Since the moving member moves along the supporting rod 15, the first connecting member and the second connecting member both are moved in an upper-lower direction by vertical vibration of the outer tub 2.

Any one of the first connecting member and the second connecting member includes a piston, and the other includes a cylinder to which the piston is inserted. The outer tub connecting part is defined as part connecting any one of the piston and the cylinder with the outer tub, and the moving member connecting part is defined as part connecting the other one of the piston and the cylinder with the moving member.

The frictional member is disposed at any one of the first connecting member and the second connecting member to offer a frictional force between itself and the other one. Since any one of the first connecting member and the second connecting member causes relative motion with respect to the other one in response to vibration, particularly, vertical vibration, of the outer tub 2, the frictional force is kinetic frictional force.

Figure 2:
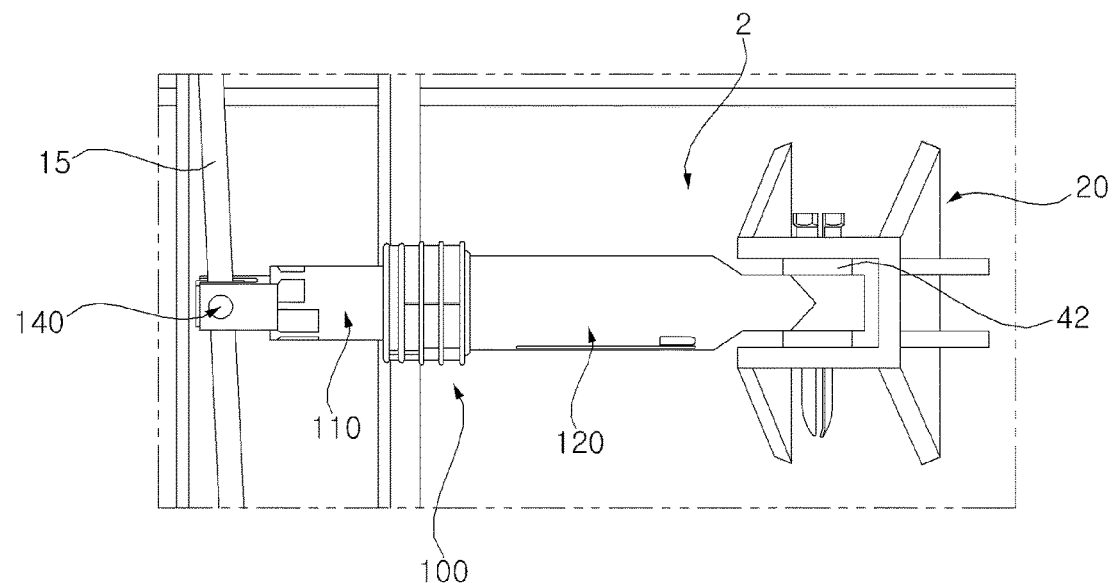
FIG. 2 is a view illustrating a horizontal vibration attenuating part according to an embodiment of the present invention.
Figure 3:
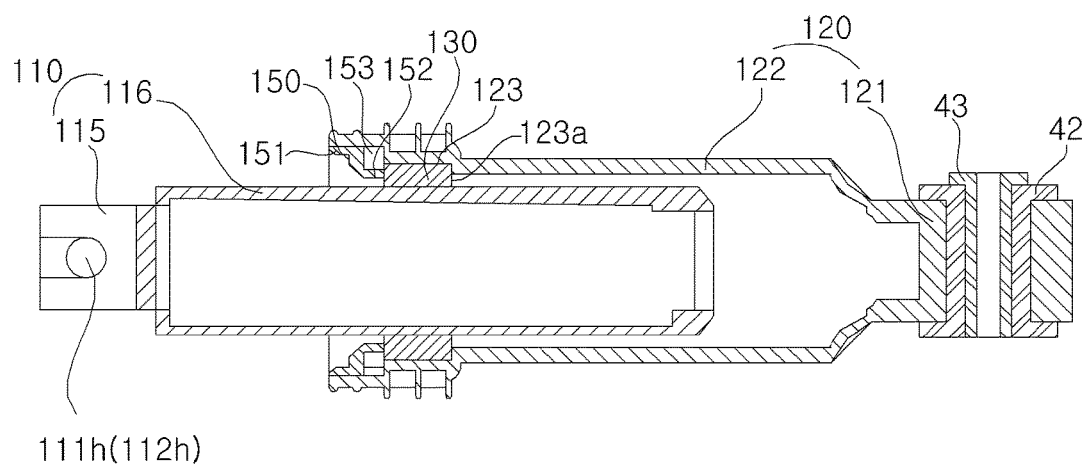
FIG. 3 is a cross-sectional view illustrating an inner structure of the horizontal vibration attenuating part of FIG. 2.

FIG. 2 illustrates a horizontal vibration attenuating part 100 according to an embodiment of the present invention. FIG. 3 is a cross-sectional view illustrating the inner structure of the horizontal vibration attenuating part 100 of FIG. 2. FIG. 4 is an exploded perspective view of the horizontal vibration attenuating part 100 of FIG. 2. The horizontal vibration attenuating part 100 according to an embodiment of the present invention is now described with reference to FIGS. 1 to 4.

The horizontal vibration attenuating part 100 includes a moving member 140, a first connecting member 110, a second connecting member 120, and a frictional member 130.

The moving member 140 is provided movably along the supporting rod 15. The moving member 140 is connected with the first connecting member 110 so that the first connecting member 110 may pivot about the moving member 140. The moving member 140 includes a moving member body 141 having a through-hole 141a through which the supporting rod 15 passes, and the moving member body 141 may include a recess 141c recessed from the inner circumferential surface of the through-hole 141a. A lubricant such as grease may be applied to the recess 141c so that the moving member 140 may smoothly move along the supporting rod 15. As the frictional force exerted between the moving member 140 and the supporting rod 15 reduces, abnormal noise that may be created as the moving member 140 moves may be reduced, and the moving member 140 may be prevented from being worn.

A lower side of the recess 141c is closed to prevent the lubricant from flowing down, and an upper part thereof may be opened or closed. In case the upper part of the recess 141c is opened, even after the horizontal vibration attenuating part 100 is completely installed, application of lubricant for maintenance may be easily performed. A plurality of recesses 141c may be provided along the inner circumferential surface of the through-hole 141a.

The first connecting member 110 may include a piston 116 and a moving member connecting part 115 connecting the piston 116 with the moving member 140. The piston 116 and the moving member connecting part 115 may be formed as separate parts that are then combined with each other, or may be integrally formed through injection molding.

The moving member connecting part 115 may be connected to be pivotable about the moving member 140. To that end, any one of the moving member 140 and the moving member connecting part 115 may have a pivot shaft 144a or 144b and the other may have an shaft coupler 111h or 112h through which the pivot shaft 144a or 144b is inserted and coupled. An end of the pivot shaft 144a or 144b may have an inclined surface 145a or 145b for, when assembled, reducing interference with the leg (refer to 211 or 212 in FIG. 6) of the moving member connecting part 115.

Hereinafter, for the purpose of description, a pair of pivot shafts 144a and 144b are protruded from both sides of the moving member body 141, and the moving member connecting part 115 has a pair of shaft couplers 111h and 112h to which the pair of pivot shafts 144a and 144b, respectively, are inserted.

The second connecting member 120 may include a cylinder 122 moving about the piston 116 as the outer tub 2 vibrates and an outer tub connecting part 121 connecting the cylinder 122 with the outer tub 2. The piston 116 of the first connecting member 110 is inserted into the inside of the cylinder 122. In such case, the outer circumferential surface of the piston 116 and the inner circumferential surface of the cylinder 122 may be brought in surface contact with each other, and in such case, the piston 116 and the cylinder 122, when relatively moved, receive a predetermined frictional force therebetween.

The outer tub connecting part 121 may be connected to be pivotable about the outer tub 2. The outer tub connecting part 121 may be rotated substantially with respect to the vertical axis. The outer tub connecting part 121 may have a coupler 121h to which a coupling member for connection with the outer tub 2 is inserted.

A connecting member coupling part 20 is coupled with the second connecting member 120 so that the second connecting member 120 may pivot about the outer tub 2. More specifically, the connecting member coupling part 20 may include a connecting part supporting plate 21 for supporting the outer tub connecting part 121 and a coupling member supporting plate 22 positioned opposite the connecting part supporting part 21. The connecting part supporting plate 21 and the coupling member supporting plate 22, respectively, may have couplers 21h and 22h through which the coupling members pass.

The outer tub connecting part 121 may be pivotably coupled with the connecting member coupling part 20 by a coupling member, such as a pin, a screw, or a bolt. Hereinafter, for the purpose of description, the coupling member is a pin 41, but the present invention is not limited thereto.

The pin 41 passes through the coupler 21h of the connecting part supporting plate 21, the coupler 121h of the outer tub connecting part 121, and the coupler 22h of the coupling member supporting plate 22. A bushing 43 and an elastic member 42 may be further provided, and in such case, the elastic member 42 is inserted through the coupler 21h of the connecting part supporting plate 21, the coupler 121h of the outer tub connecting part 121, and coupler 22h of the coupling member supporting plate 22, and the bushing 43 is then inserted into the elastic member 42, and the pin 41 is then inserted into the bushing 43. The elastic member 42 is formed of a material, such as synthetic or natural rubber, providing a bit of elastic force. The smooth pivot operation of the second connecting member 120 with respect to the outer tub 2 may be induced, together with reduced abnormal noise and enhanced assembly.

A connection between the connecting part supporting plate 21 and the coupling member supporting plate 22 may be made by a connecting plate 23, and in such case, the connecting plate 23 connects a side of the connecting part supporting plate 21 with a side of the coupling member supporting plate 22 which is positioned at the same side. Accordingly, one side between the connecting part supporting plate 21 and the coupling member supporting plate 22 is closed by the connecting plate 23 while the other side is opened to allow for smooth pivoting of the second connecting member 120.

Meanwhile, for reinforcing the strength, at least one rib 25a or 25b connecting the coupling member supporting plate 22 with the outer tub 2, at least one rib 24a or 24b connecting the connecting part supporting plate 21 with the outer tub 2, and/or at least one rib 26a or 26b connecting the connecting plate 23 with the outer tub 2 may be provided.

The connecting member coupling part 20 may be provided separately from the outer tub 2 and may be coupled or combined with the outer tub 2 via a coupling member such as a screw, bolt, or nut, or may be otherwise integrally formed with the outer tub 2.

The frictional member 130 is fixed in the cylinder 122 to provide a frictional force between itself and the piston 116. The frictional member 130 may be shaped as a tube that allows the piston 116 to pass therethrough.

The cylinder 122 includes a frictional member receiving recess 123 providing a space in which the frictional member 130 is received. The frictional member 130 may be formed of a fiber such as felt or an elastic material such as rubber or synthetic resin.

Meanwhile, the frictional member receiving recess 123 may have a side forming a step 123a with respect to the inner circumferential surface of the cylinder 122 to prevent the frictional member 130 from being moved towards the inside of the cylinder 122 and another side opened for installation of the frictional member 130, and in such case, a cylinder cover 150 may be further provided to prevent the frictional member 130 from escaping from the cylinder 122. The cylinder cover 150 has an outer ring 151 and an inner ring 152 having different outer diameters from each other, each of the outer ring 151 and the inner ring 152 having a middle part to allow the piston 116 to pass therethrough.

The cylinder cover 150 may be formed by injection molding a synthetic resin. In such case, the outer diameter of the outer ring 151 is substantially the same as the inner diameter of the cylinder 122, and as the outer ring 151 is press-fittingly inserted into the cylinder 122, separation is prevented.

The outer diameter of the inner ring 152 is smaller than the outer diameter of the outer ring 151, but is larger than the outer diameter of the piston 116. The inner ring 152 restricts the frictional member 130 from moving in an outer direction. Accordingly, even when the cylinder 122 moves as the outer tub 2 vibrates, the frictional member 130 is prevented from escaping from the cylinder 122.

Meanwhile, the cylinder cover 150 may include a coupling protrusion 154 further protruding externally in a radius direction beyond the inner circumferential surface of the cylinder 122. The coupling protrusion 154 may be protruded from either the outer ring 151 or the inner ring 152, and an insertion slot (not shown) through which the coupling protrusion 154 is inserted may be formed along a length direction from an end of the cylinder 122, through which the piston 116 is inserted. The width of the insertion slot is substantially identical to the width of the coupling protrusion 154. Accordingly, the coupling protrusion 154 is press-fittingly inserted into the insertion slot, allowing the coupling force therebetween to be maintained to a predetermined level or higher and preventing rotation of the cylinder cover 150.

A plurality of supporting ribs 153 spaced apart from each other may be formed along an outer circumferential surface of the inner ring 152. The supporting ribs 153 are preferably in tight contact with the inner circumferential surface of the cylinder 122.

Figure 5:
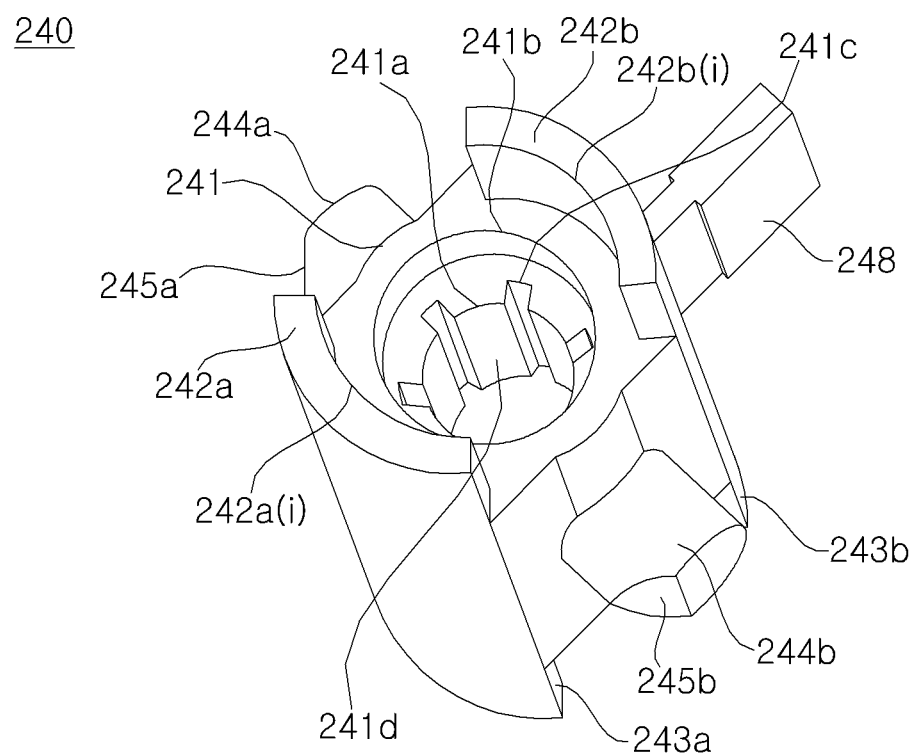
FIG. 5 is a view illustrating a moving member according to another embodiment of the present invention.
Figure 6:
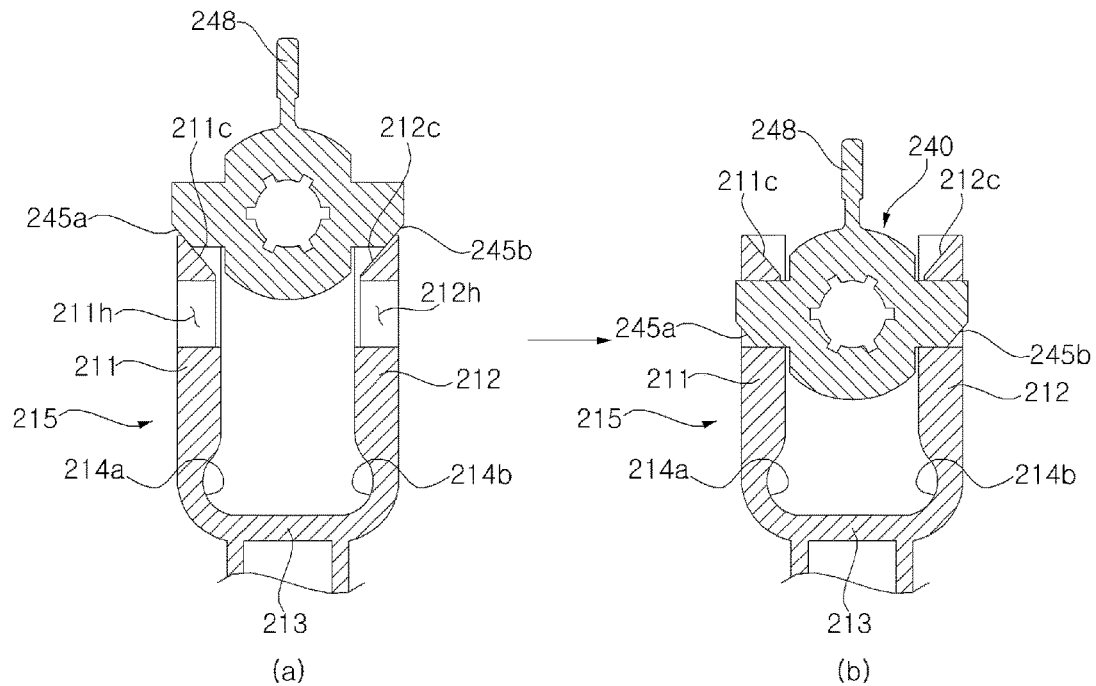
FIG. 6 is a cross-sectional view illustrating a process of coupling a moving member connecting part according to another embodiment of the present invention with the moving member of FIG. 5.
Figure 7:
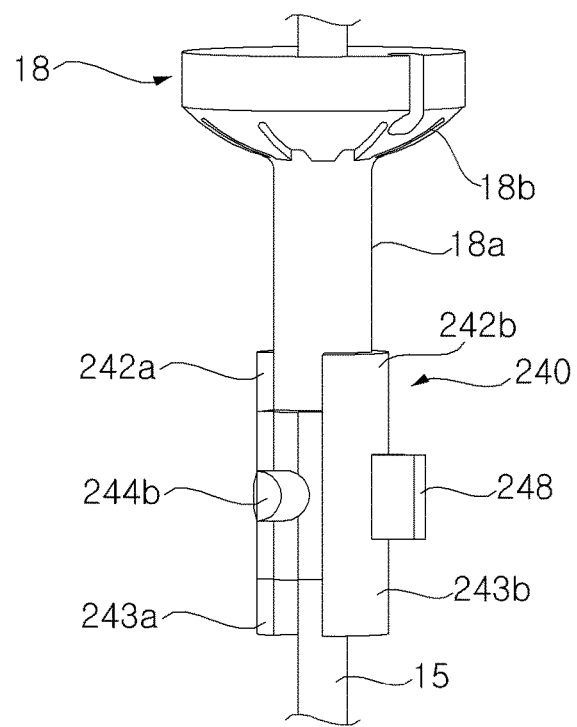
FIG. 7 is a view illustrating an example in which the moving member of FIG. 5 is fixed to a pivot.
Figure 8:
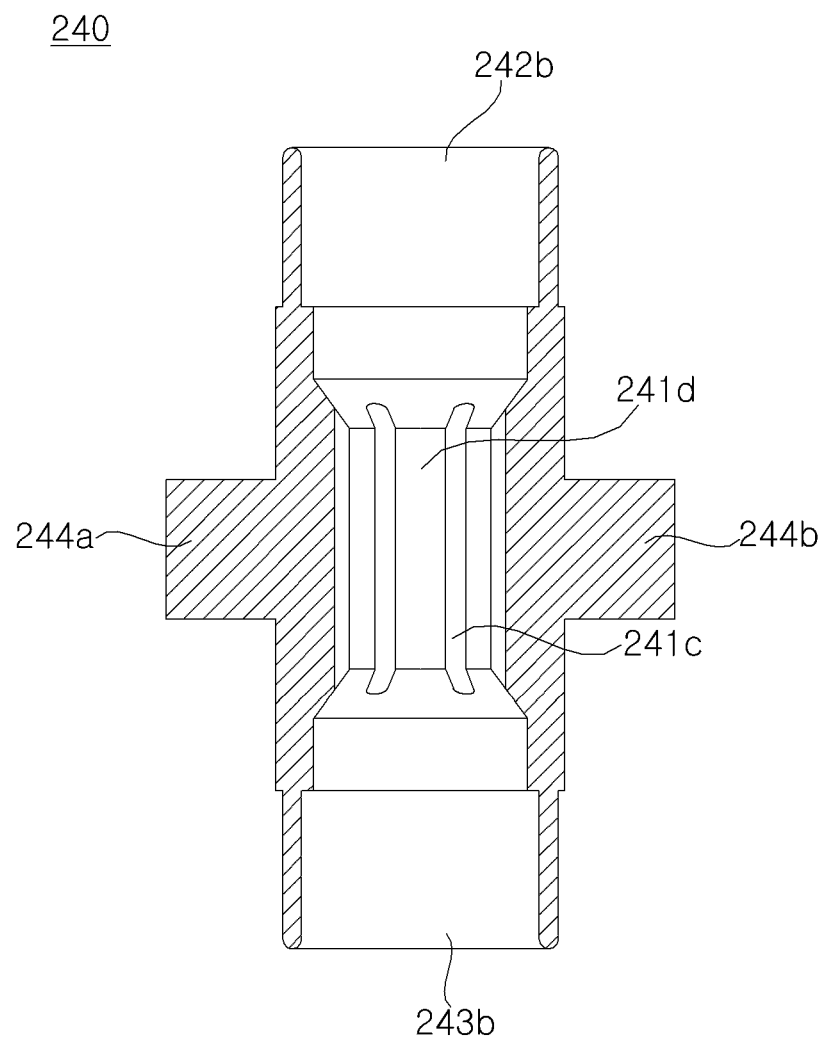
FIG. 8 is a longitudinal cross-sectional view illustrating the moving member of FIG. 5.

FIG. 5 illustrates another embodiment of a moving member. FIG. 6 is a vertical cross-sectional view illustrating a process of coupling the moving member of FIG. 5 with a moving member connecting part according to another embodiment of the present invention. FIG. 7 illustrates an example where the moving member 240 of FIG. 5 is fixed to a pivot 18. FIG. 8 is a longitudinal cross-sectional view of the moving member 240 of FIG. 5.

Referring to FIGS. 5 to 8, the moving member 240 according to another embodiment of the present invention includes a moving member body 241 having a through-hole 241a through which a supporting rod 15 passes. The moving member body 241 may include a recess 241c recessed from the inner circumferential surface 241d of the through-hole 241a. A plurality of recesses 241c may be formed along the circumferential direction. In order for the moving member 240 to smoothly move along the supporting rod 15, a lubricant such as grease may be applied to the recess 241c. As the frictional force exerted between the moving member 240 and the supporting rod 15 decreases, abnormal noise created as the moving member 240 moves may be reduced, and the moving member 240 may be prevented from being worn.

A lower side of the recess 241c may be closed to prevent the lubricant from flowing down, and an upper side thereof may be opened or closed. In case the upper side of the recess 241c is opened, application of the lubricant for maintenance may be easily performed.

Referring to FIG. 6, the moving member connecting part 215 according to this embodiment may be connected pivotably about the moving member 240. To that end, any one of the moving member 240 and the moving member connecting part 215 may have a pivot shaft 244a or 244b, and the other may have a shaft coupler 211h or 212h to which the pivot shaft 244a or 244b is inserted and combined.

Hereinafter, for the purpose of description, a pair of pivot shafts 244a and 244b are protruded from both sides of the moving member body 241, and the moving member connecting part 215 has a pair of shaft couplers 211h and 212h into which the pair pivot shafts 244a and 244b, respectively, are inserted.

The moving member connecting part 215 may include a pair of legs 211 and 212 positioned opposite each other with respect to the moving member 240, and the legs 211 and 212 respectively have shaft couplers 211h and 212h.

A leg connecting part 213 is connected between the legs 211 and 212, and portions of the legs 211 and 212, which are connected with the leg connecting part 213, have convex curved parts 214a and 214b, respectively, in a direction along which the legs 211 and 212 are away from each other.

Ends of the pivot shafts 244a and 244b may have first inclined surfaces 245a and 245b to allow the pivot shafts 244a and 244b to be smoothly inserted into the shaft couplers 211h and 212h upon assembly of the moving member connecting part 215 and the moving member 240, and ends of the legs 211 and 212, which are in contact with the first inclined surfaces 245a and 245b may have second inclined surfaces 211c and 212c corresponding to the first inclined surfaces 244a and 244b.

If a force is applied with the second inclined surfaces 211c and 212c in contact with the first inclined surfaces 245a and 245b to push the moving member connecting part 215, the distance between the pair of legs 211 and 212 is increased with the second inclined surfaces 211c and 212c in contact with the first inclined surfaces 245a and 245b, and after the second inclined surfaces 211c and 212c completely go beyond the first inclined surfaces 245a and 245b, the pivot shafts 244a and 244b are inserted into the shaft couplers 211h and 212h (refer to FIG. 6(b)).

However, although the legs 211 and 212 that went apart from each other as the second inclined surfaces 211c and 212c are moved along the first inclined surfaces 245a and 245b should return to their original positions after the pivot shafts 244a and 244b have been inserted into the shaft couplers 211h and 212h, as long as the moving member connecting part 215 is not formed of a material that has too much stiffness to deform, a slight deformation may occur, so that the legs 211 and 212 that spread apart from each other may receive a bit of restoration force that comes from the properties of the material itself. However, in some cases, plastic deformation may occur while the legs 211 and 212 spread apart from each other, and thus, the curved parts 214a and 214b may be formed between the legs 211 and 212 and the leg connecting part 213 to reinforce resistance to the external force to thereby offer more restoration force. As the curvature of the curved parts 214a and 214b varies, the deformation and restoration of the legs 211 and 212 may be smoothly fulfilled while maintaining proper elasticity.

Meanwhile, the washer is manufactured via a number of step processes during which a diversity of parts are sequentially assembled, and under such processes, the moving member 240 is inserted through a free end of the supporting rod 15 with the suspension 30 not assembled, and under such circumstance, the procedure advances to the subsequent process to assemble the moving member 240 and the moving member connecting part 215 or the supporting rod 15 and the suspension 30.

While advancing to the subsequent process, an end of the supporting rod 15 is a free end with no suspension 30 assembled yet, and thus, the moving member 240 may escape from the supporting rod 15. Accordingly, a scheme for temporarily fixing the moving member 240 needs to be considered. In the instant embodiment, a method of fixing the moving member 240 to the pivot 18 is proposed.

In such point of view, the moving member 240 includes a pivot combining part for fixing to the neck 18a of the pivot 18. More specifically, the pivot combining part may include at least one fixing protrusion 242a, 242b, 243a, and 243b extending upward or downward from the moving member body 241. Upon installation of the moving member 240, an end of the supporting rod 15 may be inserted into either one of the two opposite opened ends of the through-hole 241a formed at the moving member 240. Accordingly, the fixing protrusions 242a, 242b, 243a, and 243b are preferably formed both upwardly or downwardly from the moving member body 241 so that the moving member 240 may be coupled with the neck 18a in any direction. That is, the fixing protrusions 242a, 242b, 243a, and 243b may include a first fixing protrusion 242a and a second fixing protrusion 242b formed opposite each other, and as shown in FIG. 5, may further include a third fixing protrusion 243a and a fourth fixing protrusion 243b formed opposite each other. The neck 18a is inserted between the pair of fixing protrusions positioned opposite each other. The inner circumferential surfaces of the fixing protrusions abut the outer circumferential surface of the neck 18a with the moving member 240 fixed to the pivot 18.

In an embodiment, assuming that the neck 18a is inserted between the first fixing protrusion 242a and the second fixing protrusion 242b, the distance between the center of the through-hole 241a and the inner circumferential surfaces 242a(i) and 242b(i) of the fixing protrusions 242a and 242b is defined as an inner radius of the fixing protrusion, the inner radius of the fixing protrusion is, preferably, substantially the same or smaller than the outer radius of the neck 18a. Such structure provides a predetermined level of grip force so that the neck 18a may, without separation, remain inserted between the first fixing protrusion 242a and the second fixing protrusion 242b. When the moving member 240 is inserted onto the neck 18a, there is a gap between the first fixing protrusion 242a and the second fixing protrusion 242b so that the first fixing protrusion 242a and the second fixing protrusion 242b may spread apart from each other in an outside-radius direction, that is, in a direction apart from each other. With the first fixing protrusion 242a and the second fixing protrusion 242b spaced apart from each other, a certain level of elastic force that comes from the properties of the material (e.g., synthetic resin) constituting the moving member 240 may be provided, thus allowing the moving member 240 to be more securely fixed to the neck 18a.

Meanwhile, according to an embodiment, the pivot combining part may be formed of a ring or a tube-type fixing protrusion. In such case, the inner diameter of the fixing protrusion is preferably the same as the outer diameter of the neck 18a to be press-fittingly inserted into the neck 18a.

The moving member body 241 may communicate with the through-hole 241a and may have a pivot inserting hole 241b having a larger diameter than the through-hole 241a. At least a portion of the neck 18a is inserted into the pivot inserting hole 241b.

The moving member 240 may include a handle 248. The handle 248 may be protruded from any of the moving member body 241 and the fixing protrusion 242a, 242b, 243a, or 243b.

Figure 9:
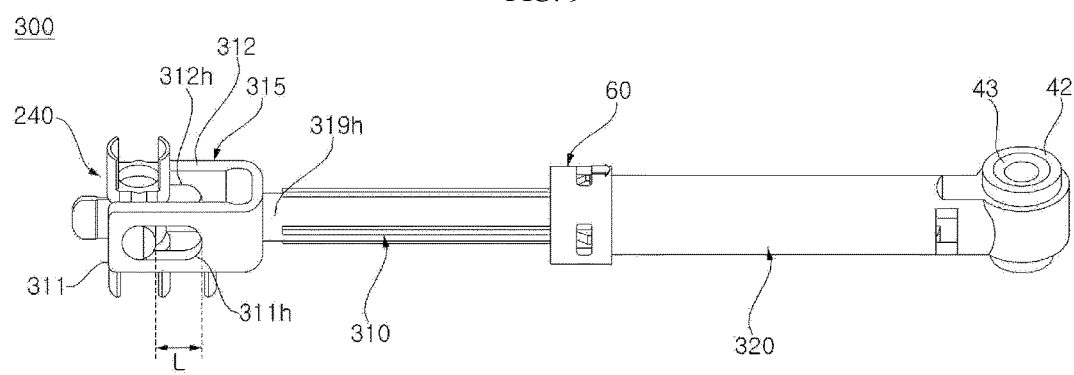
FIG. 9 is a perspective view illustrating a horizontal vibration attenuating part according to another embodiment of the present invention.
Figure 10:
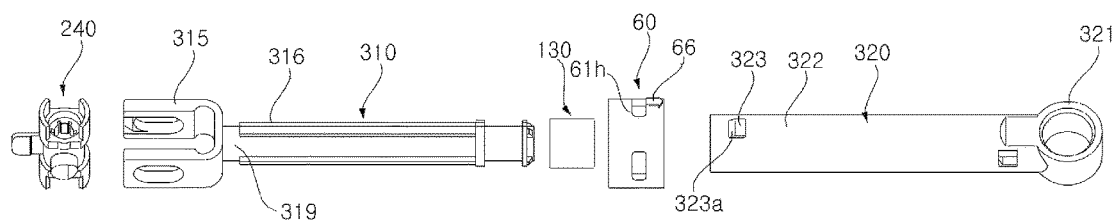
FIG. 10 is an exploded perspective view illustrating a horizontal vibration attenuating part of FIG. 9.
Figure 11:
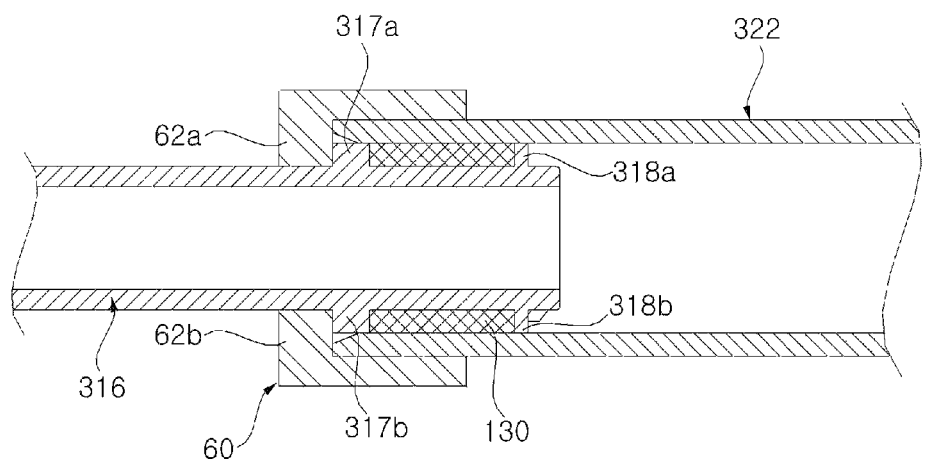
FIG. 11 is a cross-sectional view illustrating a structure in which the movement of a cylinder with respect to a piston is restricted by a restricting member in the horizontal vibration attenuating part of FIG. 9.
Figure 12:
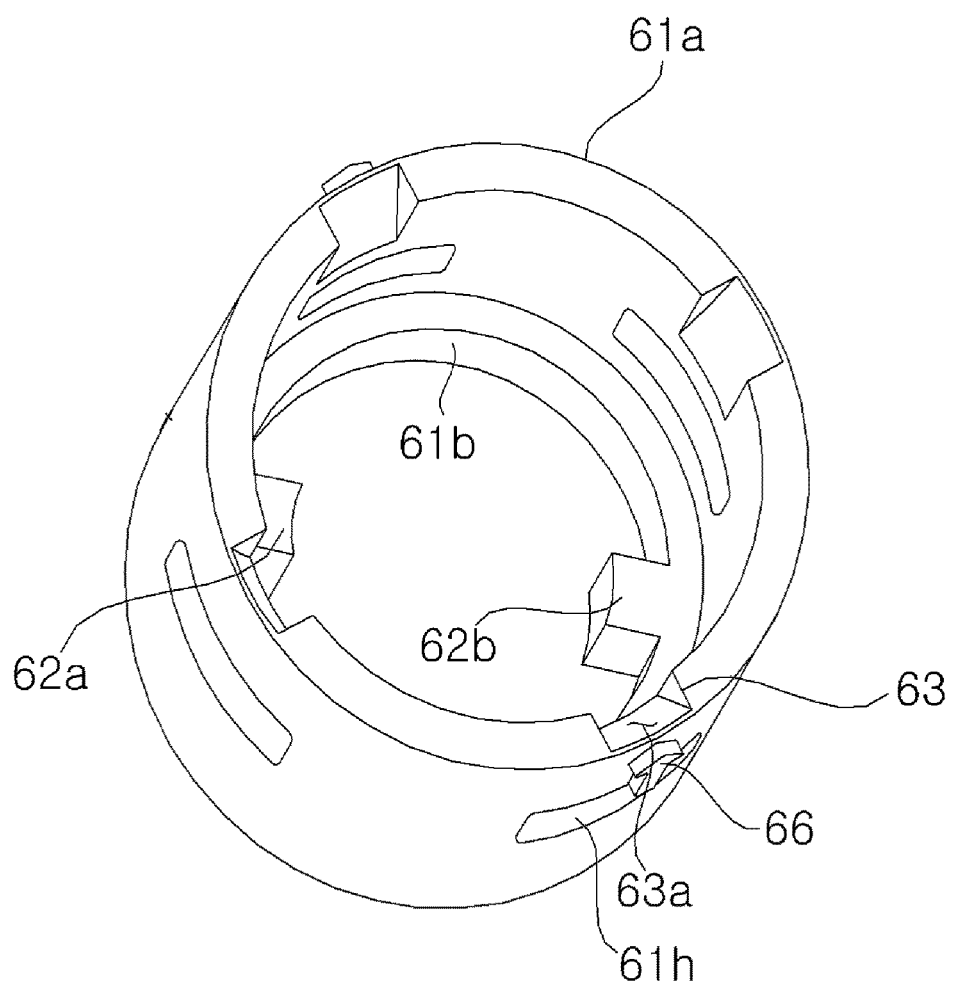
FIG. 12 is a perspective view illustrating the restricting member as shown in FIGS. 9 to 11.
Figure 13:
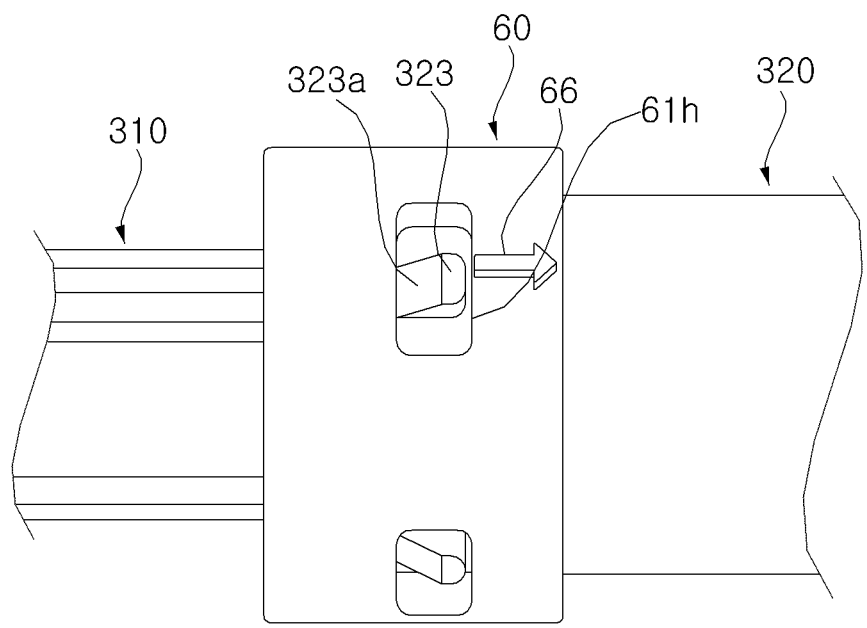
FIG. 13 is a partial enlarged view of FIG. 9.
Figure 14:
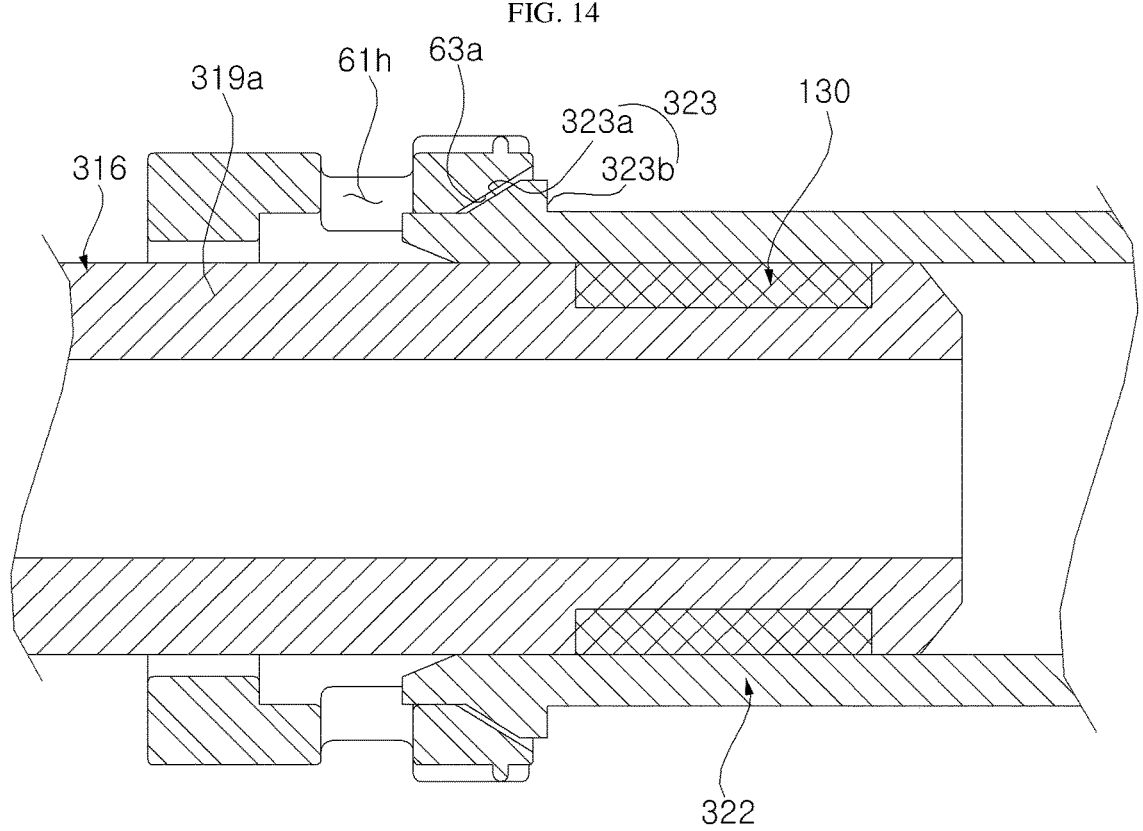
FIG. 14 is a cross-sectional view illustrating a coupling structure between the restricting member and cylinder in the horizontal vibration attenuating part of FIG. 9.
Figure 15:
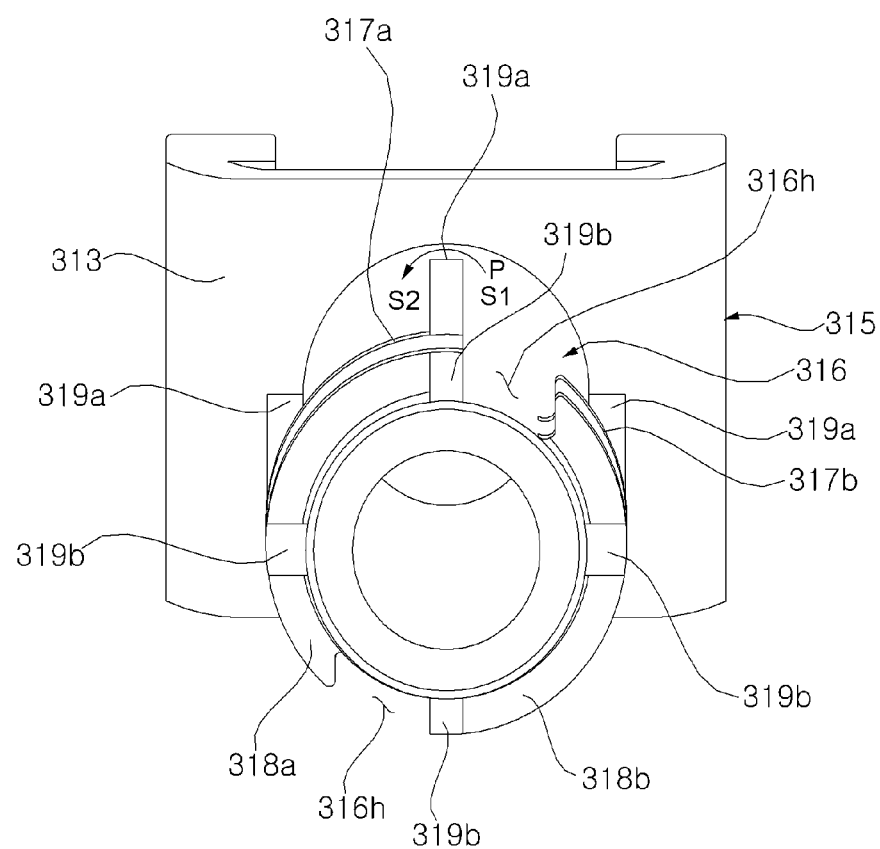
FIG. 15 is a view illustrating the first connecting member of FIG. 9 in a vertical direction.

FIG. 9 is a perspective view illustrating a horizontal vibration attenuating part 300 according to still another embodiment. FIG. 10 is an exploded perspective view illustrating the horizontal vibration attenuating part 300 of FIG. 9. FIG. 11 is a cross-sectional view illustrating the structure in which the movement of a cylinder 322 with respect to a piston 316 is restricted by a restricting member 60 in the horizontal vibration attenuating part 300 of FIG. 9. FIG. 12 is a perspective view illustrating the restricting member 60 shown in FIGS. 9 to 11. FIG. 13 is a partial enlarged view of FIG. 9. FIG. 14 is a cross-sectional view illustrating a coupling structure between the restricting member 60 and the cylinder 322 in the horizontal vibration attenuating part 300 of FIG. 9. FIG. 15 is a view obtained by viewing the first connecting member 310 of FIG. 9 from a vertical direction. Hereinafter, the same components are referenced using the same denotations and the same description as above applies to the components.

Referring to FIGS. 9 to 15, the horizontal vibration attenuating part 300 includes a first connecting member 310, a horizontal displacing part, and a frictional member 130. The horizontal displacing part connects the first connecting member 310 with the outer tub 2 and is moved along a vertical direction or longitudinal direction of the first connecting member 310 by vibration of the outer tub 2 while having a displacement with respect to the first connecting member 310 corresponding to a horizontal component distance of the moved displacement. Such horizontal displacing part may include a second connecting member 320 and a restricting member 60.

The horizontal displacing part may include a latching protrusion that is latched to the first connecting member 310 to restrict displacement when the displacement for the first connecting member 310 reaches a predetermined amount, and the latching protrusion may be formed at the restricting member 60 (refer to 62a or 62b).

The first connecting member 310 may include a piston 316 and a moving member connecting part 315 connecting the piston 316 to the moving member 240. The piston 316 and the moving member connecting part 315 may be formed as separate parts that are then combined with each other, or may be integrally formed by injection molding.

The moving member connecting part 315 is the same in configuration as the moving member connecting part 215 described above in connection with the foregoing embodiments except for the form of the shaft couplers 311h and 312h. The moving member connecting part 315 has long hole-shaped shaft couplers 311h and 312h so that the first connecting member 310 is movable with the pivot shafts 244a and 244b inserted into the shaft couplers 311h and 312h. That is, as shown in FIG. 9, the first connecting member 310 may have as long displacement as the length L even when the pivot shafts 244a and 244b are positioned in the couplers 311h and 312h.

The frictional member 130 is provided at either the first connecting member 310 or the horizontal displacing part to provide a frictional force between itself and the other. Hereinafter, the frictional member 130 is fixed to the piston 316, for the purpose of description. However, the present invention is not limited thereto.

A first transverse-direction rib 317a and a second transverse-direction rib 318a may be protruded from the outer circumferential surface of the piston 316. The first transverse-direction rib 317a and the second transverse-direction rib 318a are extended transverse with respect to the vertical direction of the piston 316.

The second transverse-direction rib 318a is formed to be spaced apart from the first transverse-direction rib 317a at a predetermined gap along a longitudinal direction of the piston 316, and the frictional member 130 is positioned between the first transverse-direction rib 317a and the second transverse-direction rib 318a.

The restricting member 60 restricts relative motion between the piston 316 and the cylinder 322. For example, considering that the cylinder 322 is moved primarily as the outer tub 2 vibrates, the movement or displacement of the cylinder 322 with respect to the piston 316 is restricted.

As the restricting member 60 is coupled with the cylinder 322, the position for the cylinder 322 is fixed, and while fixed to the cylinder 322, if the displacement of the cylinder 322 with respect to the piston 316 becomes larger than a predetermined amount, the restricting member 60 is constrained by the piston 316, thus restricting the displacement between the piston 316 and the cylinder 322.

The restricting member 60 may include a tubular tube part 61a into which the cylinder 322 may be inserted and latching protrusions 62a and 62b protruded inward along a radius direction from the tube part 61a.

Meanwhile, transverse-direction ribs 317a and 318a are formed in a partial section of the circumference on the outer circumferential surface of the piston 316. This is why when the restricting member 60 to be described below is inserted along a length direction of the piston 316, the latching protrusions 62a and 62b may form a vertical-direction path along which the lower parts may pass in the vertical direction. In other words, when the restricting member 60 is inserted through an end of the piston 316, the latching protrusions 62a and 62b should sequentially pass through the second transverse-direction rib 318a and the first transverse-direction rib 317a, and at this time, the moving path of the latching protrusions 62a and 62b are achieved through a section where no transverse-direction ribs 317a and 318a are formed.

A plurality of first transverse-direction ribs 317a and 317b may be formed along the circumferential direction from the outer circumferential surface of the piston 316, and there is a gap between the first transverse-direction ribs 317a and 317b to allow the latching protrusions 62a and 62b of the restricting member 60 to pass therethrough. That is, the first transverse-direction ribs 317a and 317b, rather than extended in the form of constituting a complete circle along the outer circumferential surface of the piston 316, each are formed restrictively in a partial section of the circumference, and a predetermined gap is present between the first transverse-direction ribs 317a and 317b adjacent to each other. In particular, as the first transverse-direction ribs 317a and 317b are latched by the latching protrusions 62a and 62b provided in the piston 316, the restricting member 60 may be prevented from being separated from the piston 316. Hereinafter, the first transverse-direction ribs 317a and 317b are referred to as anti-separation ribs.

Likewise, a plurality of second transverse-direction ribs 318a and 318b may be formed along a circumferential direction from the outer circumferential surface of the piston 316, and a gap is present between the second transverse-direction ribs 318a and 318b to allow the latching protrusions 62a and 62b of the restricting member 60 to pass therethrough. That is, the second transverse-direction ribs 318a and 318b, rather than extended in the form of constituting a complete circle along the outer circumferential surface of the piston 316, are formed restrictively in a partial section, and a predetermined gap is present between the second transverse-direction ribs 318a and 318b adjacent to each other.

An operation of inserting the restricting member 60 into the piston 316 is described. The latching protrusions 62a and 62b sequentially pass through the gap between the second transverse-direction ribs 318a and 318b and the gap between the first transverse-direction ribs 317a and 317b. That is, the gap between the second transverse-direction ribs 318a and 318b is an inlet through which the latching protrusions 62a and 62b are inserted, and the gap between the first transverse-direction ribs 317a and 317b is an outlet where the insertion of the latching protrusions 62a and 62b is complete. Hereinafter, the transverse-direction path 316h where the latching protrusion moves and passes in a length direction of the piston 316, i.e., a vertical direction is defined as a path having the inlet as an end and the outlet as the other end. In order for the first connecting member 310 to be smoothly released from the mold upon injection molding, i.e., to prevent undercut, the inlet and outlet, when viewed from the length direction (releasing direction) of the piston 316, are preferably positioned in the same section where they overlap each other.

Meanwhile, multiple vertical-direction ribs 319a, 319b, 319c, and 319d may be protruded along a length direction of the piston 316. Among the multiple ribs 319a, 319b, 319c, and 319d, the ones extended from the anti-separation ribs 317a and 317b towards the leg connecting part 313 restrict circumferential-direction movement of the latching protrusions 62a and 62b as the restricting member 60 rotates, with the restricting member 60 installed in the piston 316, and they are thus referred to as rotation-restricting ribs, hereinafter. At least a pair of rotation-restricting ribs may be extended from any anti-separation rib 317a. In the instant embodiment, formed are a pair of rotation-restricting ribs 319a and 319c spaced apart from the anti-separation ribs 317a and 317b, respectively, at a predetermined distance along the circumferential direction.

The rotation-restricting ribs 319a and 319b are extended in a length direction of the piston 316, i.e., a vertical direction. However, the rotation-restricting ribs 319a and 319b, rather than extend in the overall section between the anti-separation ribs 317a and 317b and the leg connecting part 313, extend in a partial section so as to provide at least one gap that allows the latching protrusions 62a and 62b to pass therethrough in the circumferential direction.

In the instant embodiment, an end of the rotation-restricting rib 319a or 319b forms a predetermined gap from the leg connecting part 313, thus offering a circumferential direction path 319h. If the movement of the latching protrusions 62a and 62b between a first region S1 where the latching protrusions 62a and 62b are positioned after passing through the vertical-direction path 316h with respect to the rotation-restricting ribs 319a and 319b and a second region S2 that is restricted to between the pair of rotation-restricting ribs 319a and 319b may be permitted through a predetermined path where no rotation-restricting ribs are formed, the configuration, number or form of the rotation-restricting ribs are not limited. As shown in FIG. 15, P denotes a moving path of the latching protrusion 62a or 62b in the process where the restricting member 60 is installed, and it shows that upon assembling the first connecting member 310 and the horizontal displacing part (or restricting member 60) the latching protrusions 62a and 62b are moved along the vertical direction through the section where no rotation-restricting ribs 319a and 319b are formed, passed through the section where no rotation-restricting ribs 319a and 319b are formed, and are then positioned between the pair of rotation-restricting ribs 319a and 319b.

Meanwhile, the vertical-direction rib 319b that has not been described is extended from the second transverse-direction rib 318a or 318b toward an end of the piston 316.

If the restricting member 60 is inserted through an end of the piston 316, the latching protrusions 62a and 62b pass through the vertical-direction path 316h to approach the leg connecting part 313, and if the restricting member 60 is rotated under such state (where the latching protrusions 62a and 62b are positioned in the first region S1), the latching protrusions 62a and 62b are moved to the second region S2 through the rotation-restricting circumferential direction path 319h. The movement of the restricting member 60 along the length direction of the piston 316 in the second region S2 is stuck by the anti-separation rib 317a and is thus restricted, and thus, the restricting member 60 is prevented from being separated from the piston 316. In particular, since the movement of the latching protrusions 62a and 62b along the circumferential direction in the second region S2 is restricted between the pair of rotation-restricting ribs 319a and 319b, the restricting member 60 is not separated from the piston 316 as long as the latching protrusions 62a and 62b is intentionally rendered to pass through the circumferential direction path 319h.

A coupling protrusion 323 may be protruded from the outer circumferential surface of the cylinder 322, and the restricting member 60 may have a coupling protrusion coupler 61h coupled with the coupling protrusion 323. The coupling protrusion coupler 61h may be formed in the tube part 61a. When the restricting member 60 is installed in the cylinder 322, the coupling protrusion 323 is inserted into the coupling protrusion coupler 61h of the restricting member 60, and the restricting member 60 is thus fixed.

The coupling protrusion 323 may include a first inclined surface 323a with a height decreasing in an opposite direction of a direction (direction of an arrow denoted with reference numeral 66 in FIG. 10) in which the restricting member 60 is installed. Further, an end of the restricting member 60 may have a moving guidance groove 63 for guiding movement for installing the coupling protrusion 323, and the moving guidance groove 63 may have a second inclined surface 63a abutting the first inclined surface 323a of the coupling protrusion 323. Upon installation of the restricting member 60, the second inclined surface 63a moves over the first inclined surface 323a. Since the first inclined surface 323a and the second inclined surface 63a are formed to have an inclined structure, interference may be reduced, and damage to the coupling protrusion 323 or restricting member 60 due to stress concentration upon assembly of the restricting member 60 may be prevented.

Meanwhile, while the coupling protrusion 323 is completely inserted into the coupling protrusion coupler 61h, a latching jaw 323b formed to be substantially perpendicular with the outer circumferential surface of the cylinder 322 in an opposite direction of the first inclined surface 323a is latched to the circumference of the coupling protrusion coupler 61h. Accordingly, separation between the restricting member 60 and the coupling protrusion 323 may be prevented.

An installation direction guidance mark 66 indicates the direction in which the restricting member 60 is installed, and the installation direction is also a direction along which the coupling protrusion coupler 61h for coupling with the coupling protrusion 323 is moved.

Figure 16:
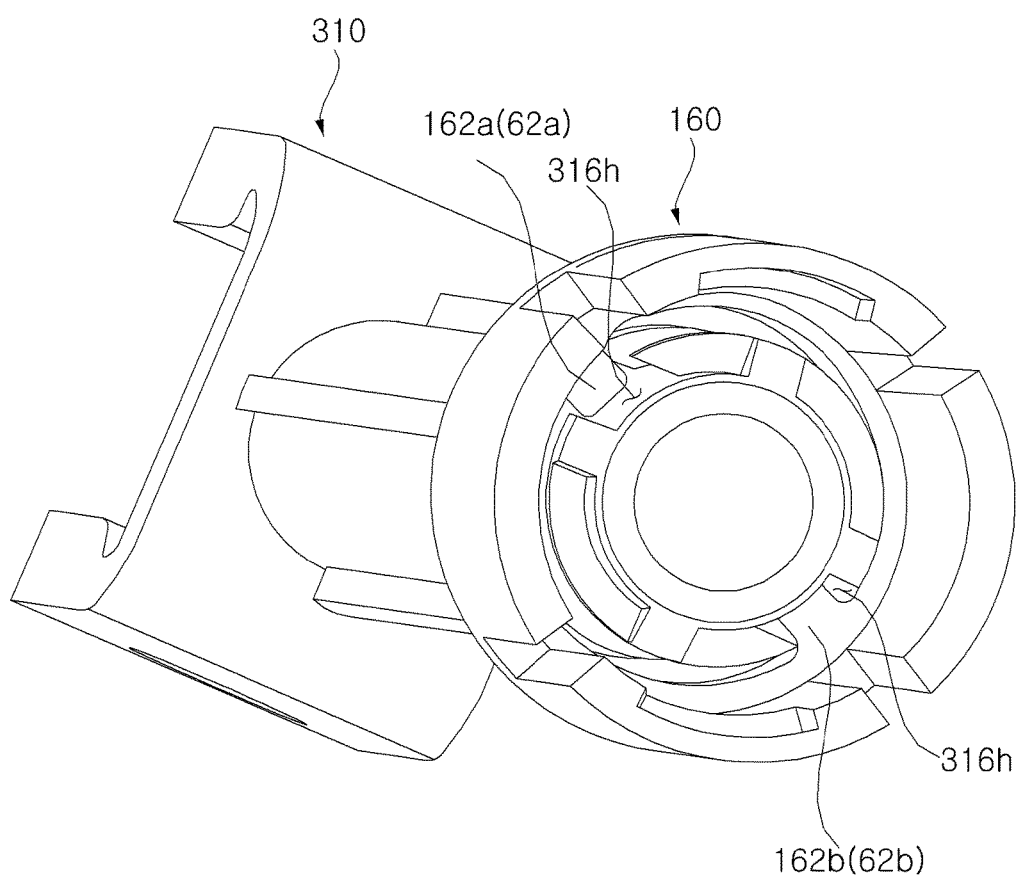
FIG. 16 is a perspective view illustrating an example in which a restricting member according to another embodiment of the present invention is assembled with the first connecting member of FIG. 15.
Figure 17:
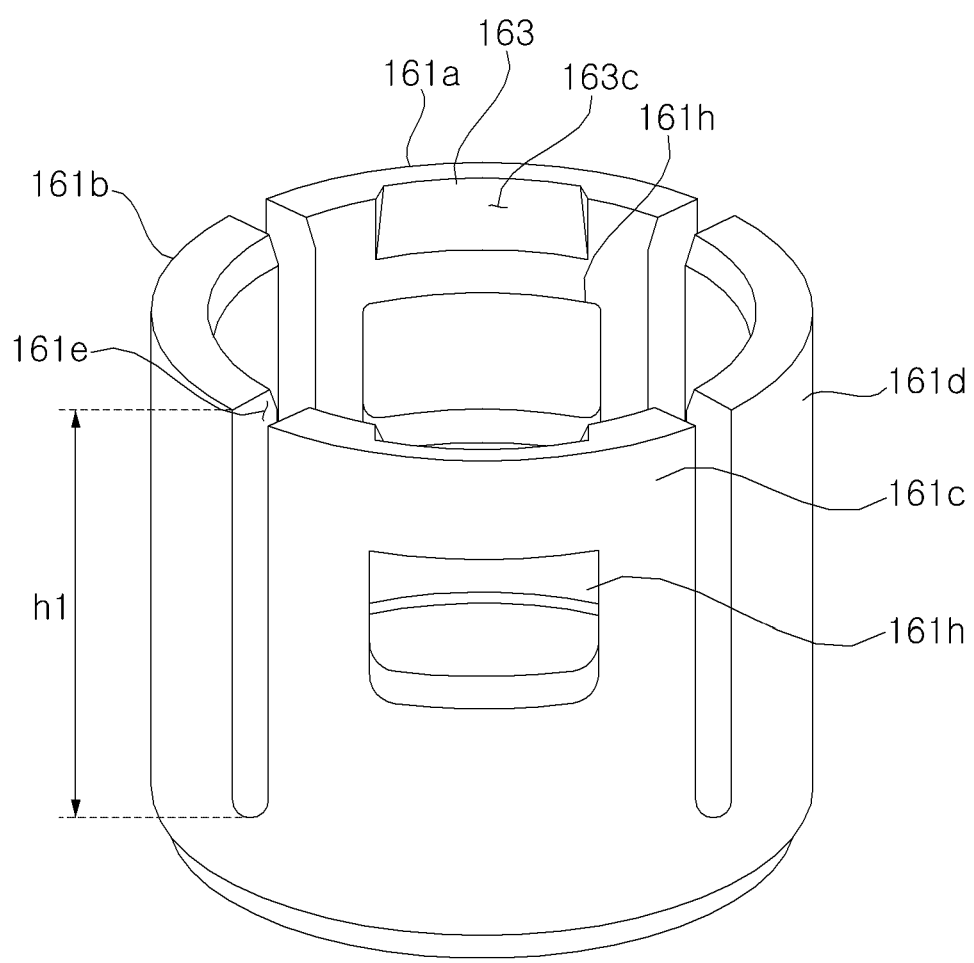
FIG. 17 is a perspective view illustrating the restricting member of FIG. 16.

FIG. 16 is a perspective view illustrating an example where a restricting member 160 according to another embodiment of the present invention is assembled with the first connecting member 310 of FIG. 15. FIG. 17 is a perspective view illustrating the restricting member 160 shown in FIG. 16. Referring to FIGS. 16 and 17, a difference between the restricting member 160 according to this embodiment and the restricting member 60 according to the above-described embodiment is that a slit 161e cut along a length direction is provided.

The slit 161e is extended along the length direction of the restricting member 160. The slit 161e is partially cut but not fully cut from an end of the restricting member 160 to its opposite end (h1 in FIG. 17 indicates the length of the slit 161e).

The restricting member 160 includes multiple side walls 161a, 161b, 161c, and 161d separated by slits 161e. Since both side walls 161b and 161c of the slit 161e go a bit apart from each other while the coupling protrusion 323 is inserted into the coupling protrusion coupler 161h, the coupling protrusion 323 may be smoothly inserted into the coupling protrusion coupler 161h. Further, while the piston 316 is moved as the outer tub 2 vibrates, stress may be concentrated to the restricting member 160 by interference that occurs between the piston 316 and the anti-separation ribs 317a and 317b. However, the two opposite side walls 161b and 161c are elastically deformed by the slit 161e, allowing for dispersing of the stress, and resultantly, increased durability.

The coupling protrusion coupler 161h may be formed in at least one of the side walls 161a, 161b, 161c, and 161d, and ends of the side walls having the coupling protrusion coupler 161h have a moving guidance groove 163 that may be formed with a second inclined surface 163c.

The coupling protrusion coupler 161h and the second inclined surface 163c are substantially the same in configuration as the coupling protrusion coupler 61h and the second inclined surface 63c described above in the foregoing embodiments, and detailed description thereof is omitted.

Further, as shown in FIG. 16, the restricting member 160 has coupling protrusions 162a and 162b that are substantially the same in configuration as the coupling protrusions 62a and 62b of the restricting member 60 in the above-described embodiments.

Figure 18:
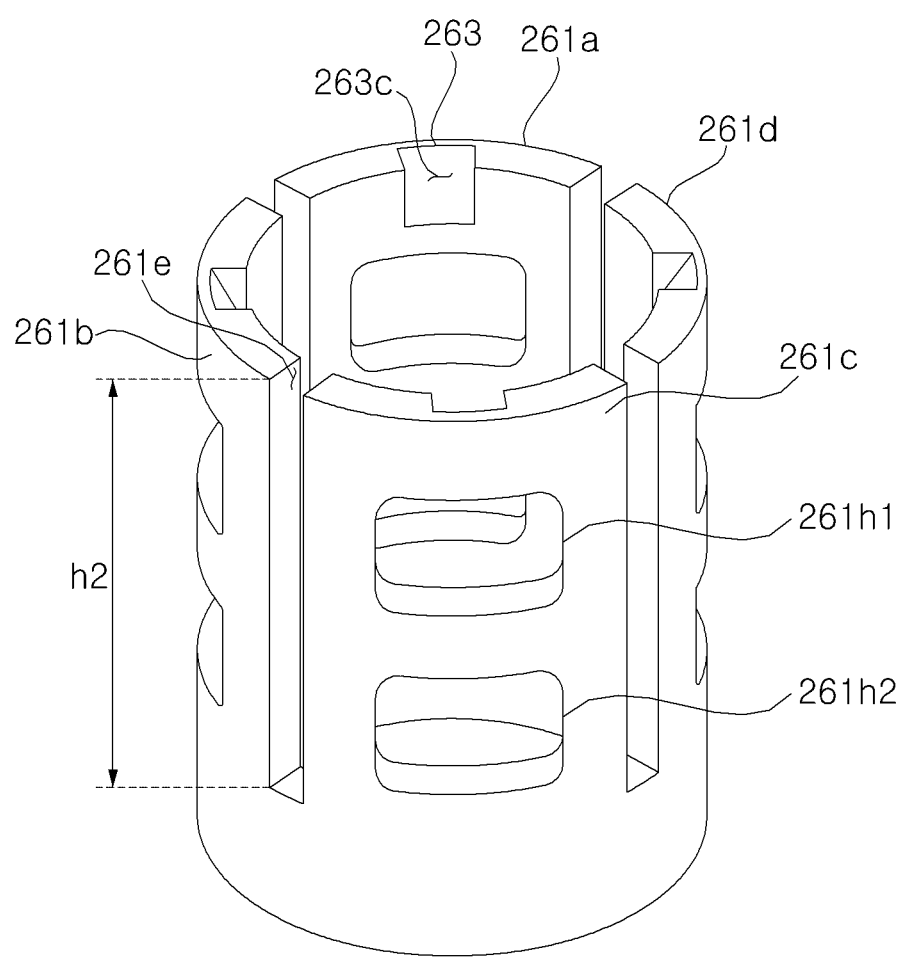
FIG. 18 is a perspective view illustrating a restricting member according to another embodiment of the present invention.

FIG. 18 is a perspective view illustrating a restricting member 260 according to still another embodiment of the present invention. Referring to FIG. 18, the restricting member 260 according to this embodiment includes slit 261e, side walls 261a, 261b, 261c, and 261d, a moving guidance groove 263, and a second inclined surface 263c. The restricting member 260 is the same as the restricting member 160 described in the above embodiments in that the restricting member 260 has coupling protrusions (not shown). However, a plurality of coupling protrusion couplers 261h1 and 261h2 are formed along a length direction of at least one side wall 261c, and accordingly, the length of the side walls 261a, 261b, 261c, and 261d or slit 261e is increased (h2>h1).

The plurality of coupling protrusions are formed in the side walls 261a, 261b, 261c, and 261d, and the position of the latching protrusion is adjusted by selectively coupling the coupling protrusion 323 with any one of the plurality of coupling protrusion couplers 261h1 and 261h2. Depending on the position of the latching protrusion, the displacement of the cylinder 322 may be limited in different ways. For reference, the latching protrusion has substantially the same configuration as the latching protrusion 62a or 162a in the above embodiments described in connection with FIG. 11 or 16.

Cracks may be prevented from occurring due to stress concentration from deformation of the side walls 261a, 261b, 261c, and 261d. The stress exerted to the side walls 261a, 261b, 261c, and 261d may be dispersed through the edges of the coupling protrusion couplers 261h1 and 261h2. The coupling protrusion couplers 261h1 and 261h2 preferably include curved parts having a predetermined curvature.

Figure 19:
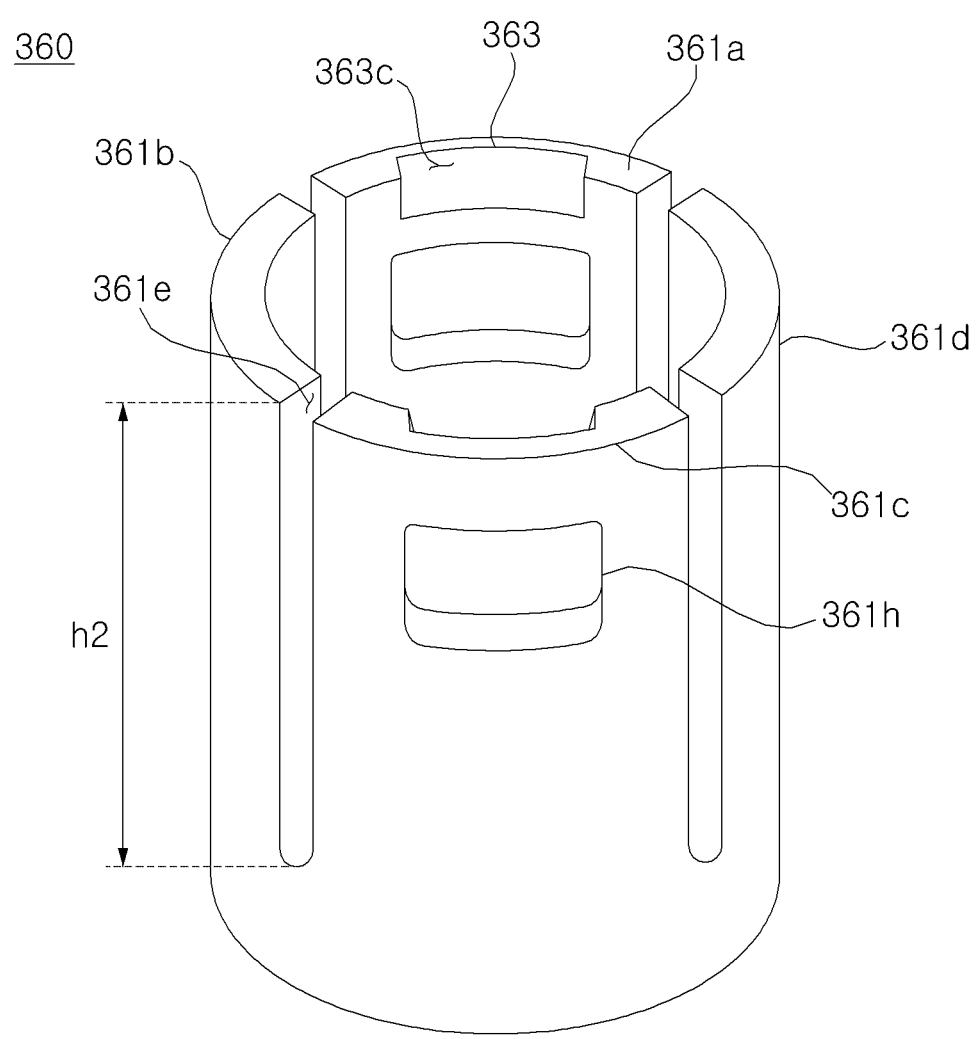
FIG. 19 is a perspective view illustrating a restricting member according to another embodiment of the present invention.

FIG. 19 is a perspective view illustrating a restricting member 360 according to yet still another embodiment of the present invention. Referring to FIG. 19, the restricting member 360 according to this embodiment includes slit 361e, side walls 361a, 361b, 361c, and 361d, a moving guidance groove 363, and a second inclined surface 363c. The restricting member 360 is the same as the restricting member 260 according to the above embodiments in that the restricting member 360 has coupling protrusions (not shown). However, the restricting member 360 has an extra part that is equal to or larger than the length occupied by the coupling protrusion coupler 361h in a length direction of the side wall 361c. In other words, the length h2 of the slit 361e is twice or more of the vertical-direction length of the coupling protrusion coupler 361h.

In this case, the overall length of the side wall 361c and the length h2 of the slit 361e are determined within such a range that the stress exerted to the side wall 361c is smaller than the yield stress at which a material starts to be plastically deformed. In other words, the restricting member 360 according to the instant embodiment is appropriate for when the material does not have cracks even though a plurality of coupling protrusion couplers are not formed in the side wall 361c.

Figure 20:
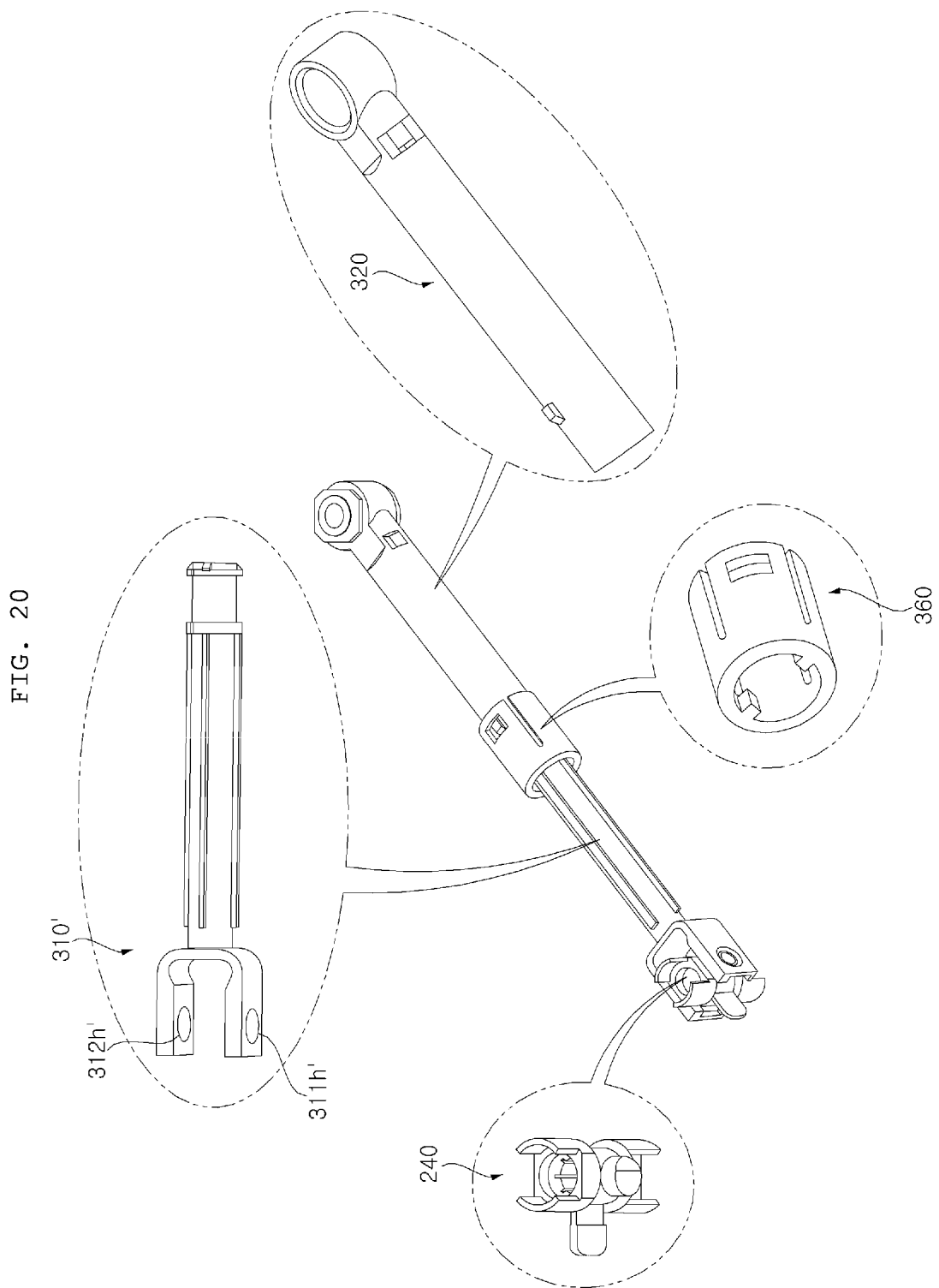
FIG. 20 is a perspective view illustrating a horizontal vibration attenuating part according to another embodiment of the present invention.

FIG. 20 is a perspective view illustrating a horizontal vibration attenuating part according to still another embodiment of the present invention. Referring to FIG. 20, the horizontal vibration attenuating part includes a first connecting member 310', a second connecting member 320, a moving member 240, a restricting member 360, and a restricting member 130 (not shown) fixed to the first connecting member 310'. The same components as those described in the above embodiments are assigned with the same denotations, and detailed description thereof is omitted.

However, the first connecting member 310' differs from the first connecting member 310 according to the above embodiments in that the couplers 311h' and 312h' formed in the moving member connecting part are not long holes. In other words, even when the outer tub 2 vibrates, there is no displacement of the couplers 311h' and 312h' with respect to the pivot shafts 244a and 244b, and accordingly, a banging sound that may occur due to a collision between the pivot shafts 244a and 244b and the couplers 311h' and 312h' may be prevented, thus leading to increased silence.

Figure 21:
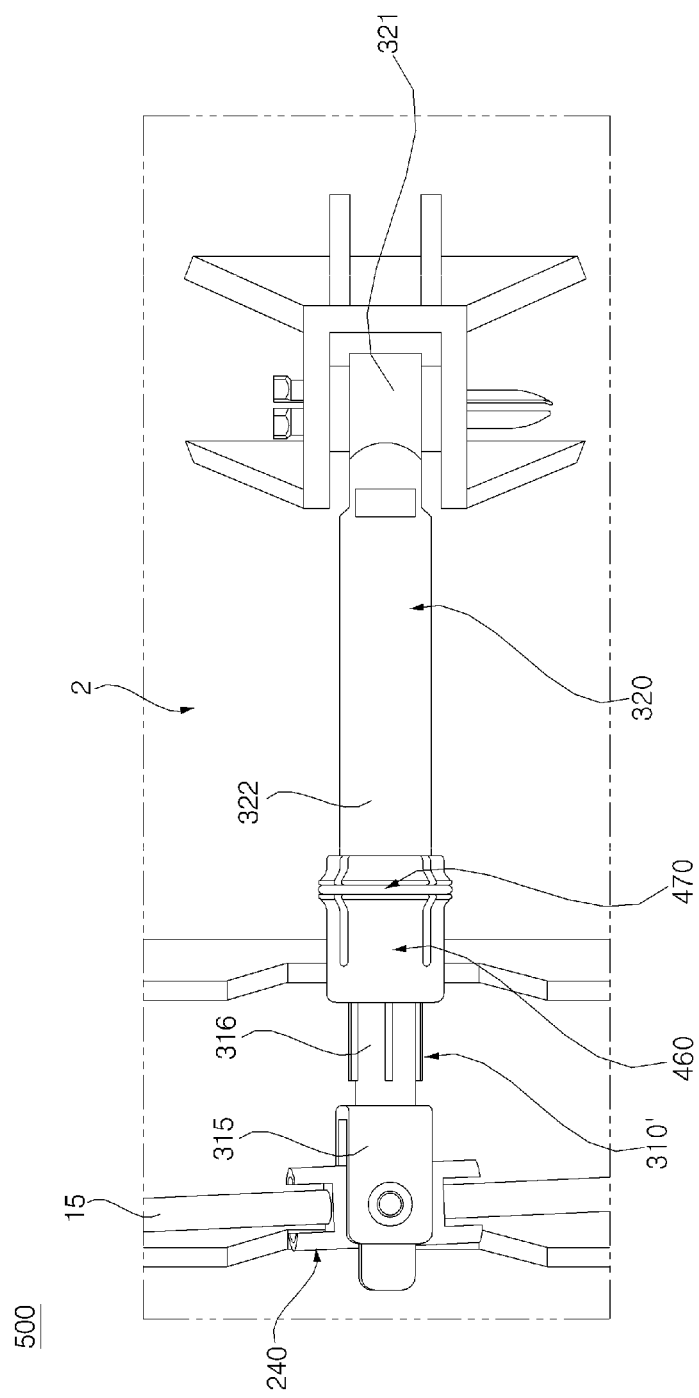
FIG. 21 is a view illustrating a horizontal vibration attenuating part according to another embodiment of the present invention.
Figure 22:
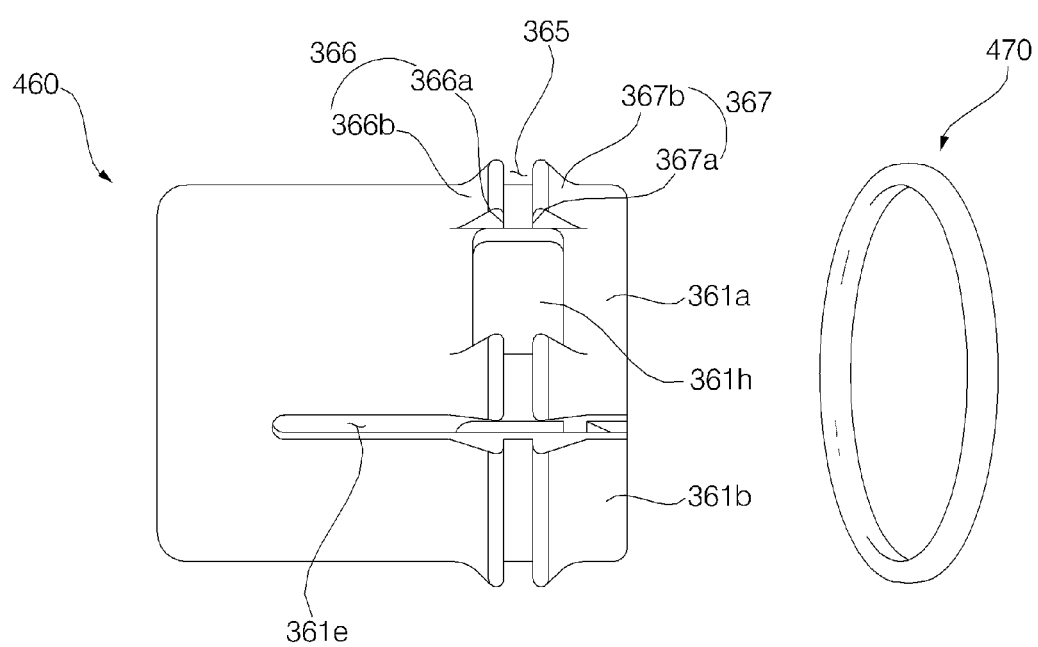
FIG. 22 is a view illustrating the restricting member and ring of FIG. 21.

FIG. 21 illustrates a horizontal vibration attenuating part 500 according to yet still another embodiment of the present invention. FIG. 22 shows the restricting member and the ring of FIG. 21.

The same elements as those described in the above embodiments are assigned with the same denotations, and detailed description thereof is omitted.

The horizontal vibration attenuating part 500 according to this embodiment includes a restricting member 460 and a ring 470. The restricting member 460 includes a ring coupling groove 365 in addition to the restricting member 360 shown in FIG. 19, and the other configurations are the same as those of the restricting member 360. Accordingly, the following description primarily focuses on the ring coupling groove 365, and what has been described above in connection with FIG. 19 applies to the other configurations.

The restricting member 460 includes slits 361e between the side walls 361a, 361b, 361c, and 361d. Since the first connecting member 310' and the second connecting member 320 are connected with each other via the restricting member 460, the motion of the moving member connecting part 315 that is moved along the moving member 240 when the outer tub 2 vibrates and the relative motion between the piston 316 and the cylinder 322 cause force to be exerted in various directions, and during such process, both side walls 361a, 361b, 361c, and 361d with respect to the slits 361e may fall excessively apart from each other. Although some degree of deformation between the side walls 361a, 361b, 361c, and 361d presents a predetermined elastic force to disperse or mitigate the force exerted to the restricting member 460 to thereby increasing durability or stability, too excessive falling apart from the side walls 361a, 361b, 361c, and 361d may cause cracks or plastic deformation in the material, and in the case the restricting member 460 is formed of an injection-molded synthetic resin, this may cause a serious problem. The ring 470 is provided to prevent such problems and is inserted into the restricting member 460. The ring 470 may be formed of an elastic material, such as natural or synthetic rubber, to provide predetermined elasticity.

The restricting member 460 may have a ring coupling groove 365 along the circumferential direction so that the ring 470 may be fixedly inserted into the restricting member 460. The ring coupling groove 365 may be provided between a pair of groove forming protrusions 366 and 367 protruded opposite each other from any side walls 361a, 361b, 361c, and 361d. The groove forming protrusions 366 and 367 may include a first groove forming protrusion 366 extended along the circumferential direction and a second groove forming protrusion 367 disposed apart from the first groove forming protrusion 366 at a predetermined distance in a vertical direction of the restricting member 460.

The groove forming protrusions 366 and 367, respectively, have good restricting surfaces 366a and 367a for restricting the ring coupling groove 365, and each groove restricting surface 366a and 367a is protruded substantially perpendicular with the side walls 361a, 361b, 361c, and 361d.

Further, the groove forming protrusions 366 and 367, respectively, have outer surfaces 366b and 367b extended in an opposite direction of the groove restricting surfaces 366a and 367a, and these outer surfaces 366b and 367b are concave surfaces.

The groove forming protrusions 366 and 367 are extended from the section other than the section where the coupling protrusion coupler 361h and the slit 361e are formed, and accordingly, the ring coupling groove 365, although discontinuous at the sections where the coupling protrusion coupler 361h and the slit 361e are formed, is extended overall along one circumference.

Figure 23:
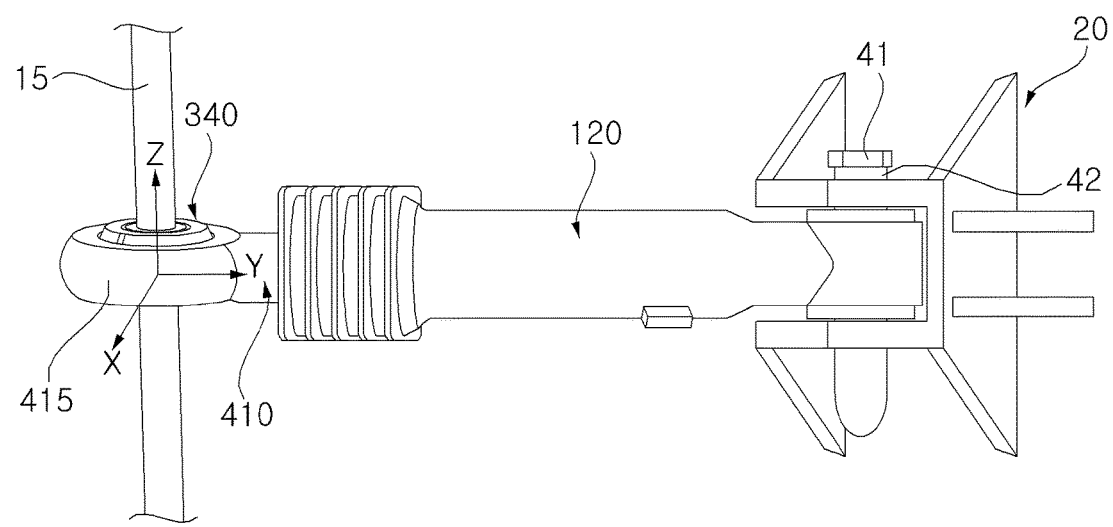
FIG. 23 is a view illustrating a horizontal vibration attenuating part according to another embodiment of the present invention.
Figure 24:
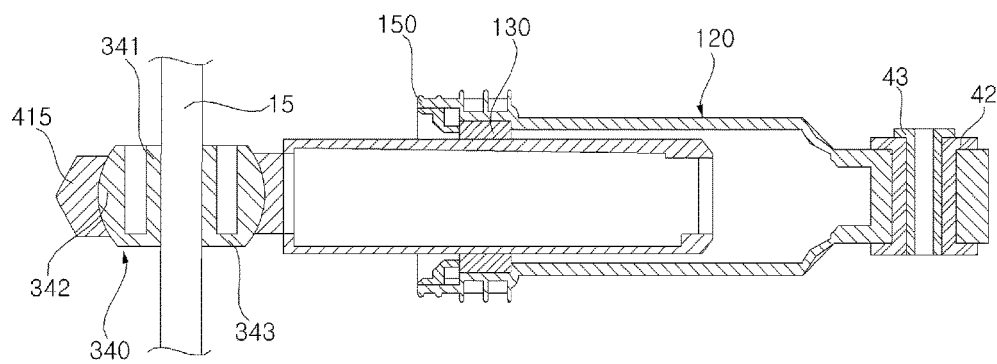
FIG. 24 is a cross-sectional view illustrating the horizontal vibration attenuating part of FIG. 23.
Figure 25:
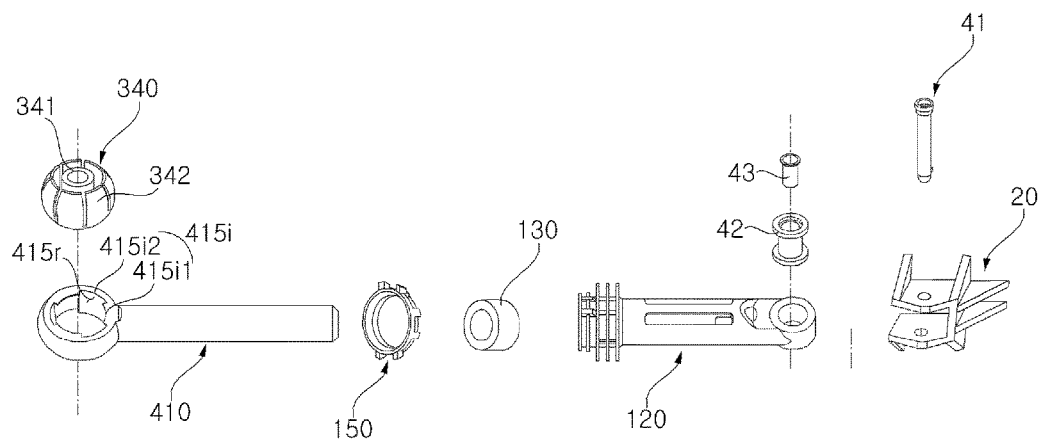
FIG. 25 is an exploded perspective view illustrating the horizontal vibration attenuating part of FIG. 23.

FIG. 23 illustrates a horizontal vibration attenuating part 600 according to yet still another embodiment of the present invention. FIG. 24 is a cross-sectional view illustrating the horizontal vibration attenuating part 600 shown in FIG. 23. FIG. 25 is an exploded perspective view illustrating the horizontal vibration attenuating part 600 shown in FIG. 23.

Referring to FIGS. 23 to 25, the horizontal vibration attenuating part 600 includes a first connecting member 410, a second connecting member 120, a moving member 340, and a frictional member 130 (not shown) fixed to the second connecting member 120. The same components as those described in the above embodiments are assigned with the same denotations, and detailed description thereof is omitted.

In particular, the horizontal vibration attenuating part 600 according to the instant embodiment differs from the horizontal vibration attenuating parts according to the foregoing embodiments in light of the coupling structure between the moving member 340 and the moving member connecting part 415.

More specifically, the moving member 340 includes a moving member body 341 having a through-hole through which the supporting rod 15 passes, a moving member base part 343 externally extended from the moving member body 341, and a plurality of spherical shells 342 extended from the moving member base part 343 and having an outer circumferential surface constituting part of a spherical surface.

The spherical shells 342 are connected with each other through the moving member base part 343, and opposite sides of the parts connected with the moving member base part 343 are free ends. Accordingly, they may be pivoted about the portions connected with the moving member base part 343 by an external force exerted to the free ends. In particular, in case the moving member 340 is formed of an injection-molded synthetic resin, the pivoting operation may be elastically done by a bit of elasticity of the material itself.

As shown in the drawings, the maximum distance of the spherical shell 342 from the center (Z axis) of the supporting rod 15 is positioned between the portion where the spherical shell 342 is connected with the moving member base part 343 and the free end.

The moving member connecting part 415 is formed of a socket wrapping around the moving member 340, and the inner circumferential surface 415*i* contacting the spherical shell 342 of the moving member 340 is preferably formed of a spherical surface corresponding to the shape of the spherical shell 342.

Meanwhile, the moving member connecting part 415 may include a pressurizing surface 415*i*1 and an insertion supporting surface 415*i*2 on the inner circumferential surface abutting the spherical shell 342. Preferably, the pressurizing surface 415*i*1 and the insertion supporting surface 415*i*2 are alternately formed along the circumferential direction.

The pressurizing surface 415*i*1 pressurizes the spherical shell 342 so that the spherical shell 342 pivots with respect to the connecting part with the moving member base part 343. A strong repulsive force is exerted between the pressurizing surface 415*i*1 and the spherical shell 342 by an elastic force exerted from the spherical shell 342.

At least one section of the inner circumferential surface 415*i* of the moving member connecting part 415 constitutes a receiving recess 415*r* in which the spherical shell 342 is received. A plurality of receiving recesses 415*r* may be formed to be spaced apart from each other along the circumferential direction. The insertion supporting surface 415*i*2 is a surface abutting the outer circumferential surface of the spherical shell 342 among the surfaces constituting the receiving recess 415*r*.

At least one of the plurality of spherical shells 342 is inserted into the receiving recess 415*r*, and at least another one is pressurized by the pressurizing surface 415*i*1. Since the spherical shell 342 is received in the receiving recess 415*r*, the Z-axis (length direction of the supporting rod 15) rotation of the moving member connecting part 415 with respect to the moving member 340 is restricted.

The moving member 340 and the moving member connecting part 415 may be coupled with each other based on a ball-socket joint. The moving member 340 is a sort of ball element that rotates about the supporting rod 15, as its axis (Z axis), and the moving member connecting part 415 connected with the moving member 340 is a socket element wrapping around the ball. The moving member connecting part 415 may rotate about each of the X, Y, and Z axes within a predetermined range. However, since at least one of the plurality of spherical shells 342 is received in the receiving recess 415*r*, so that the Z-axis rotation (i.e., rotation about the supporting rod 15 as an axis) of the spherical shell 342 with respect to the moving member connecting part 415 is restricted, the Z-axis rotation of the moving member connecting part 415 is performed alongside the rotation of the moving member 340.

The horizontal vibration attenuating part 500 according to this embodiment offers more degree of freedom to the moving member connecting part 415, so that even when the moving member 340 moves along the supporting rod 15, more stability and reliability may be ensured for a coupling between the moving member connecting part 415 and the moving member 340.

The laundry treatment apparatus according to the embodiments of the present invention achieves a coupling between a moving member and a moving member connecting part based on a ball-socket joint, so that the moving member connecting part may be moved with a sufficient degree of freedom.

Figure 26:
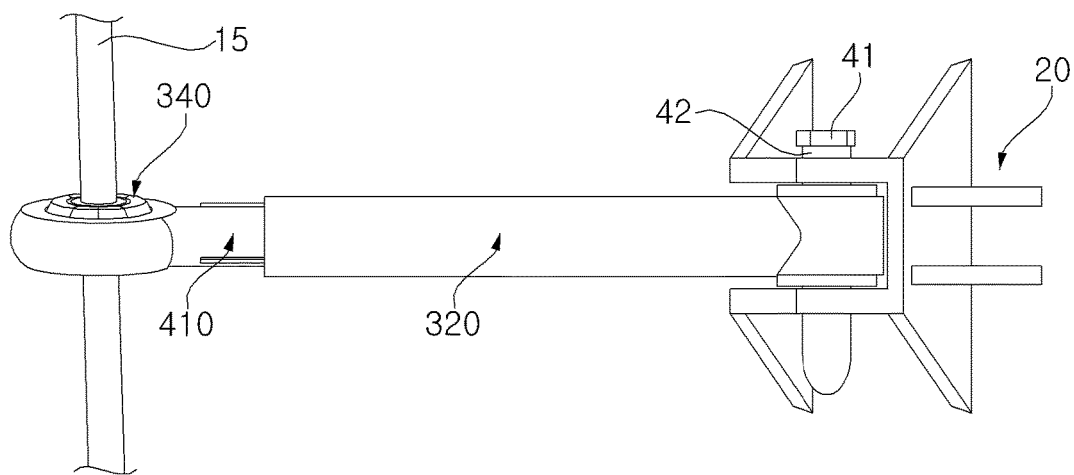
FIG. 26 is a view illustrating a horizontal vibration attenuating part according to another embodiment of the present invention.
Figure 27:
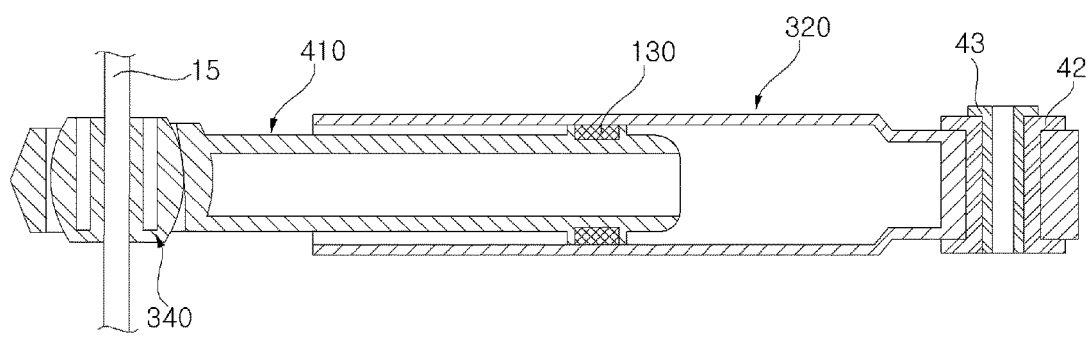
FIG. 27 is a cross-sectional view illustrating the horizontal vibration attenuating part of FIG. 26.

FIG. 26 illustrates a horizontal vibration attenuating part 700 according to yet still another embodiment of the present invention. FIG. 27 is a cross-sectional view illustrating the horizontal vibration attenuating part 700 shown in FIG. 26.

Referring to FIGS. 26 and 27, the horizontal vibration attenuating part 700 includes a first connecting member 410, a second connecting member 320, and a moving member 340. The same components as those described in the above embodiments are assigned with the same denotations, and detailed description thereof is omitted.

The horizontal vibration attenuating part 700 according to this embodiment differs from the horizontal vibration attenuating parts according to the embodiments described in connection with FIGS. 23 to 25 in that the frictional member 130 is fixed to the first connecting member 410. The piston of the first connecting member 410 is substantially the same as the piston 316 described above in connection with FIGS. 9 to 15, and the above description applies to the specific configurations.

The laundry treatment apparatus according to the embodiments of the present invention may reduce the horizontal vibration of the outer tub.

Further, the laundry treatment apparatus according to the embodiments of the present invention may prevent the moving member from escaping through the free end of the moving member while the supporting rod is not yet connected with the outer tub upon manufacture.

Further, the laundry treatment apparatus according to the embodiments of the present invention may increase capacity of the outer tub.

Still further, the laundry treatment apparatus according to the embodiments of the present invention may prevent collision between the outer tub and the casing, thus leading to an enhancement in durability and prevention of abnormal noise.

Yet still further, the laundry treatment apparatus according to the embodiments of the present invention may quickly attenuate vibration of the outer tub even when the laundry is rendered eccentric to a certain degree, thus reducing the driving time to distribute the laundry. Accordingly, considering the fact that a laundry distribution operation is typically performed for changing the positions of the laundry in the inner tub in order to control the vibration of the outer tub to a predetermined level or lower for entrance into the dehydration process, the time required for entering into the dehydration process may be reduced.

Although the embodiments of the present invention have been disclosed for illustrative purposes, those skilled in the art will appreciate that various modifications, additions and substitutions are possible, without departing from the scope and spirit of the invention.

What is claimed is:

1. A vibration attenuation device of a laundry treatment apparatus, comprising:
    a pivot pivotably supported with respect to a casing which forms an outer appearance of the laundry treatment apparatus;
    a supporting rod having an end connected with the pivot and another end connected with an outer tub provided in the casing to support the outer tub in the casing;
    a moving member movably provided along the supporting rod;
    a first connecting member connected with the moving member;
    a second connecting member whose position varies with respect to the first connecting member as the outer tub vibrates; and a frictional member provided at any one of the first connecting member and the second connecting member, the frictional member providing a frictional force between itself and the other connecting member, wherein the moving member includes a combining part provided to fix the moving member to the pivot to prevent the supporting rod from escaping through the other end of the moving member while the supporting rod is not connected with the outer tub.

2. The vibration attenuation device of claim 1, wherein the moving member further includes a moving member body having a through-hole through which the supporting rod passes, wherein the combining part extends from the moving member body in a direction toward an end of the supporting rod and having a first fixing protrusion and a second fixing protrusion formed opposite each other, and wherein the combination of the moving member and the pivot is achieved as the pivot is inserted into a space between the first fixing protrusion and the second fixing protrusion.

3. The vibration attenuation device of claim 2, wherein the pivot comprises:

a pivot body pivotably supported with respect to the casing; and a neck extending from the pivot body and having the supporting rod penetrate through an inside of the neck, wherein the neck is inserted into a space between the first fixing protrusion and the second fixing protrusion.

4. The vibration attenuation device of claim 2, wherein the combining part further comprises a third fixing protrusion and a fourth fixing protrusion extending from the moving member body in a direction toward the other end of the supporting rod and formed opposite each other.

5. The vibration attenuation device of claim 3, wherein the moving member further comprises a handle protruded from the moving member body.

6. The vibration attenuation device of claim 2, wherein the moving member body includes:

a through-hole through which the supporting rod passes; and a pivot inserting hole communicating with the through-hole, the pivot inserting hole having a larger diameter than the through-hole so as to permit insertion of a neck of the pivot.

7. The vibration attenuation device of claim 1, wherein the first connecting member includes a moving member connecting part pivotably connected with the moving member.

8. The vibration attenuation device of claim 7, wherein the moving member may include a pair of pivot shafts extending in opposite directions thereof, and wherein the moving member connecting part comprises:

a pair of legs extending parallel to each other, each having a shaft coupler through which the pivot shaft is inserted; and a leg connecting part connecting the pair of legs with each other.

9. The vibration attenuation device of claim 8, wherein an end of the pivot shaft includes a first inclined surface for reducing interference between the pivot shaft and the leg while the pivot shaft is inserted into the shaft coupler.

10. The vibration attenuation device of claim 9, where an end of each leg includes a second inclined surface corresponding to the first inclined surface.

11. The vibration attenuation device of claim 8, wherein the moving member connecting part has a curved part at a portion where the leg is connected with the leg connecting part, the curved part being convex in a direction along which the pair of legs are apart from each other.

12. The vibration attenuation device of claim 8, wherein the first connecting member includes a piston extending from the leg connecting part, and wherein the second connecting member includes a cylinder through which the piston is inserted, the cylinder having a displacement with respect to the piston as the outer tub vibrates.

13. The vibration attenuation device of claim 12, wherein the frictional member is fixed to the piston to provide a frictional force between itself and the cylinder.

14. The vibration attenuation device of claim 1, wherein any one of the moving member and the first connecting member includes a pivot shaft and the other has a shaft coupler into which the pivot shaft is inserted and combined.

15. The laundry treatment apparatus of claim 14, wherein the first connecting member is displaced by the shaft coupler with respect to the moving member within a limited range.

16. The laundry treatment apparatus of claim 15, wherein the shaft coupler is a long hole formed long to guide movement of the first connecting member.

17. The laundry treatment apparatus of claim 16, wherein a pair of pivot shafts extend in opposite directions thereof, and wherein the moving member connecting part includes a pair of legs extending in parallel with each other, each of the legs having a shaft coupler.

18. The vibration attenuation device of claim 2, wherein the moving member body further includes at least one recess recessed from an inner circumferential surface of the through-hole, wherein a lubricant may be applied to the at least one recess so that the moving member may smoothly move along the supporting rod.

19. The vibration attenuation device of claim 18, wherein a lower side of the at least one recess is closed such that lubricant does not flow out of the at least one recess.

20. The vibration attenuation device of claim 18, wherein the at least one recess includes a plurality of recesses.

* * * * *